(12) United States Patent
Takahashi et al.

(10) Patent No.: US 12,095,331 B2
(45) Date of Patent: *Sep. 17, 2024

(54) VIBRATION ACTUATOR AND ELECTRONIC DEVICE

(71) Applicants: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(72) Inventors: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 40 days.

This patent is subject to a terminal disclaimer.

(21) Appl. No.: 17/835,993

(22) Filed: Jun. 9, 2022

(65) Prior Publication Data

US 2022/0329139 A1 Oct. 13, 2022

Related U.S. Application Data

(63) Continuation of application No. 16/885,269, filed on May 28, 2020, now Pat. No. 11,394,285.

(30) Foreign Application Priority Data

May 31, 2019 (JP) .................................. 2019-103148
Jan. 31, 2020 (JP) .................................. 2020-015500

(51) Int. Cl.
H02K 33/02 (2006.01)
G08B 6/00 (2006.01)
(Continued)

(52) U.S. Cl.
CPC ............... *H02K 33/04* (2013.01); *G08B 6/00* (2013.01); *H02K 11/01* (2016.01)

(58) Field of Classification Search
CPC ........ H02K 33/00; H02K 33/02; H02K 33/04; H02K 33/16; H02K 33/18; H02K 11/01;
(Continued)

(56) References Cited

U.S. PATENT DOCUMENTS 1,833,914 A 12/1931 Ruben
3,582,875 A * 6/1971 Van Wambeck ....... G01V 1/181
367/182
(Continued)

FOREIGN PATENT DOCUMENTS

CN 101944819 1/2011
EP 1737110 12/2006
(Continued)

OTHER PUBLICATIONS

European Search Report and the European Search Opinion dated Oct. 22, 2020 From the European Patent Office Re. Application No. 20177415.5. (9 Pages).
(Continued)

*Primary Examiner* — Tran N Nguyen

(57) ABSTRACT

A vibration actuator includes: a movable body having: a disk-shaped magnet; a pair of magnetic parts fixed to both surfaces of the magnet; and a pair of spring stopper parts connected to the magnetic parts; a pair of elastic support parts connected to the spring stopper parts and configured to support the movable body; a fixing body configured to connect to the elastic support parts with a protection wall (Continued)

portion, a pair of annular coils and a magnetic shield disposed in this order at an outer circumferential side, and accommodate the movable body such that the movable body is capable of reciprocally vibrating in an axial direction; and a cylindrical resin case having, on a circumferential wall portion, an opening portion for wires for supplying power to the coils and configured to close upper and lower faces of the circumferential wall portion and accommodate the fixing body.

4 Claims, 28 Drawing Sheets

(51) Int. Cl.
*H02K 11/01* (2016.01)
*H02K 33/04* (2006.01)

(58) Field of Classification Search
CPC . G08B 6/00; F16F 13/26; F16F 7/1011; F16F 15/005; F16F 13/08; F16F 15/0275; F16F 15/022
See application file for complete search history.

(56) References Cited

U.S. PATENT DOCUMENTS

| | | | |
|---|---|---|---|
| 3,878,504 | A | 4/1975 | Sears |
| 5,057,732 | A | 10/1991 | Fukaya |
| 6,455,962 | B2 | 9/2002 | Suzuki et al. |
| 9,297,916 | B2 * | 3/2016 | Woo ................. G01V 1/182 |
| 11,394,285 | B2 * | 7/2022 | Takahashi ............. G08B 6/00 |
| 2002/0070613 | A1 | 6/2002 | Cordiale |
| 2012/0032535 | A1 | 2/2012 | Park |
| 2014/0035397 | A1 * | 2/2014 | Endo ................. H02K 33/18 310/30 |
| 2015/0198216 | A1 | 7/2015 | Koyama et al. |
| 2017/0141665 | A1 | 5/2017 | Genderjahn et al. |
| 2017/0317552 | A1 | 11/2017 | Kanaya |
| 2017/0328441 | A1 * | 11/2017 | Kanaya ............. F16F 15/005 |
| 2018/0278136 | A1 | 9/2018 | Odajima |
| 2020/0381987 | A1 | 12/2020 | Takahashi et al. |

FOREIGN PATENT DOCUMENTS

| | | |
|---|---|---|
| JP | 58-031779 | 3/1983 |
| JP | 08-116658 | 5/1996 |
| JP | 11-262234 | 9/1999 |
| JP | 2003-062525 | 3/2003 |
| JP | 2003-300013 | 10/2003 |
| JP | 3748637 | 2/2006 |
| JP | 2006-296127 | 10/2006 |
| JP | 2009-033864 | 2/2009 |
| JP | 2010-246205 | 10/2010 |
| JP | 2012-213710 | 11/2012 |
| JP | 2013-126299 | 6/2013 |
| JP | 2015-091585 | 5/2015 |
| JP | 2015-223563 | 12/2015 |
| JP | 2016-013554 | 1/2016 |
| JP | 2017-070018 | 4/2017 |
| JP | 2017-158274 | 9/2017 |
| JP | 2017-200362 | 11/2017 |
| JP | 2018-164398 | 10/2018 |
| JP | 2019-068569 | 4/2019 |
| WO | WO 02/091551 | 11/2002 |

OTHER PUBLICATIONS

Notice of Allowance dated Mar. 11, 2022 from US Patent and Trademark Office Re. U.S. Appl. No. 16/885,269. (9 pages).
Notice of Reasons for Refusal dated Mar. 2, 2021 From the Japan Patent Office Re. Application No. 2020-015500 and Its Translation Into English. (8 Pages).
Notice of Reasons for Refusal dated May 10, 2022 From the Japan Patent Office Re. Application No. 2022-036452. (4 Pages).
Notice of Reasons for Refusal dated Oct. 12, 2021 From the Japan Patent Office Re. Application No. 2021-077642 and Its Translation Into English. (9 Pages).
Notice of Reasons for Refusal dated Jun. 29, 2021 From the Japan Patent Office Re. Application No. 2021-077642 and Its Translation Into English. (8 Pages).
Notice of Reasons for Rejection dated Oct. 20, 2020 From the Japan Patent Office Re. Application No. 2020-015500. (4 Pages).
Official Action dated Sep. 22, 2021 from the US Patent and Trademark Office Re. U.S. Appl. No. 16/885,269. (16 pages).
European Search Report and the European Search Opinion dated Feb. 28, 2023 From the European Patent Office Re. Application No. 22209581.2. (9 Pages).

* cited by examiner

VIBRATION ACTUATOR AND ELECTRONIC DEVICE

CROSS REFERENCE TO RELATED APPLICATIONS

The present application is continuation of application Ser. No. 16/885,269, filed May 28, 2020, which claims the benefit of priority from Japanese Patent Application No. 2019-103148, filed on May 31, 2019 and Japanese Patent Application No. 2020-015500, filed on Jan. 31, 2020, the disclosure of which including the specification, drawings and abstract is incorporated herein by reference in its entirety.

TECHNICAL FIELD

The present invention relates to a vibration actuator and an electronic device including the vibration actuator.

BACKGROUND ART

Conventionally, a vibration actuator is mounted as a vibration source in electronic devices having a vibration function. The electronic devices can notify a user of an incoming call or improve an operational feel and/or realism by driving the vibration actuator to transmit vibrations to the user to give a physical feeling. Here, examples of the electronic devices include a portable game terminal, a controller (game pad) of a stationary game machine, a portable communication terminal such as a mobile phone or a smart phone, a portable information terminal such as a tablet PC, and a portable device such as a wearable terminal capable of being worn on clothes or an arm.

A vibration actuator used in a pager or the like as disclosed in Patent Literature (hereinafter, referred to as "PTL") 1 has been known as a vibration actuator of a miniaturizable structure mounted on a portable device, for example.

This vibration actuator includes a pair of plate-like elastic bodies that are supported respectively on opening edge portions of a cylindrical frame such that the elastic bodies face each other. In addition, in this vibration actuator, a yoke fitted with a magnet is fixed to a raised central whirl-shaped portion of one of the pair of plate-like elastic bodies, and the yoke is supported inside the frame.

The yoke, together with the magnet, forms a magnetic field generator, and a coil attached to the other plate-like elastic body is disposed in the magnetic field of this magnetic field generator. The coil is cylindrically formed using an enameled wire obtained by baking a resin on the surface of a copper wire. The coil is a so-called air-core coil using a self-bonding wire, and thus occupies a smaller arrangement space. The pair of plate-like elastic bodies are selectively resonated to generate vibrations by application of switched currents of different frequencies through an oscillation circuit to the coil, so that the yoke vibrates in the center-line direction of the frame within the frame.

In this vibration actuator, the distance between the magnet and the coil and the distance between the yoke and the coil are greater than the distance between the yoke and the inner circumferential wall of the frame. Thus, the yoke first collides with the inner circumferential wall of the frame when the vibration actuator is externally impacted. Accordingly, neither the yoke nor the magnet come into contact with the coil, so that the coil is prevented from being damaged.

However, in practice, there is a risk that the pair of plate-like elastic bodies for elastically supporting a movable body including the yoke may be impacted and damaged since the yoke including the magnet collides with the frame.

Therefore, PTL 1 also discloses a second embodiment in which a fixing body is provided with a shaft on which the movable body slides to move in the vibration direction, and the shaft prevents the yoke being the movable body from moving toward the inner circumferential surface of the frame even when the vibration actuator is externally impacted, so that the yoke is prevented from colliding with the frame.

CITATION LIST

Patent Literature

PTL 1: JP Patent No. 3,748,637

SUMMARY OF INVENTION

Technical Problem

However, although the configuration of the conventional vibration actuator in which the fixing body is provided with the shaft on which the movable body slides makes it possible to restrict, by the shaft, the movement of the movable body so as to increase the impact resistance, there is a risk that the movable body slides on the shaft to cause a sliding noise when the vibration actuator is driven.

It is a problem that noises such as a vibrational sound caused due to contact reduces the ability of vibrational expression of the vibration actuator itself. Accordingly, it is desired that a vibration actuator which vibrates as a vibrating body when a movable body is driven have a high ability of vibrational expression with minimal vibration noise, and output a preferable tactile vibration that can be sufficiently sensed by a user. In addition, it is desirable that the vibration actuator be less costly than the conventional vibration actuator using an air-core coil.

An object of the present invention is to provide a vibration actuator and an electronic device which can achieve miniaturization at low cost, have an impact resistance, and generate a preferable tactile vibration at high output.

Solution to Problem

In order to achieve the above-mentioned object, the present invention employs a configuration of a vibration actuator in which the vibration actuator includes:

a fixing body including a coil;

a movable body including a magnet that is disposed inside the coil in a radial direction of the coil to be relatively movable in a vibration direction orthogonal to the radial direction of the coil; and an elastic supporting part that supports the movable body such that the movable body is freely movable with respect to the fixing body, in which cooperation between the coil supplied with electricity and the magnet causes the movable body to vibrate with respect to the fixing body, the fixing body includes a bobbin-shaped coil holding part that is disposed to surround the magnet externally in the radial direction and holds the coil disposed outside the bobbin-shaped coil holding part in the radial direction, the bobbin-shaped coil holding part includes a coil protection wall portion that is disposed inside the coil in the radial direction of the coil with a gap being interposed between the coil protection wall portion and the magnet, the coil protection wall portion inhibiting contact between the coil and the movable body including the magnet, the elastic supporting part includes at least two or more leaf springs installed between the movable body and the fixing body to sandwich the movable body in the vibration direction, and the at least two or more leaf springs support the movable body such that, in a non-vibration state and in a vibration state of the movable body, the movable body is freely movable in the vibration direction without making contact with the bobbin-shaped coil holding part.

The present invention employs a configuration in which the vibration actuator having the above-described configuration is mounted.

Advantageous Effects of Invention

The present invention is capable of achieving miniaturization at low cost, having impact resistance, and generating preferable tactile vibration at high output.

DESCRIPTION OF EMBODIMENTS

Hereinafter, embodiments of the present invention will be described in detail with reference to the drawings.

[Entire Configuration of Vibration Actuator]

Figure 1:
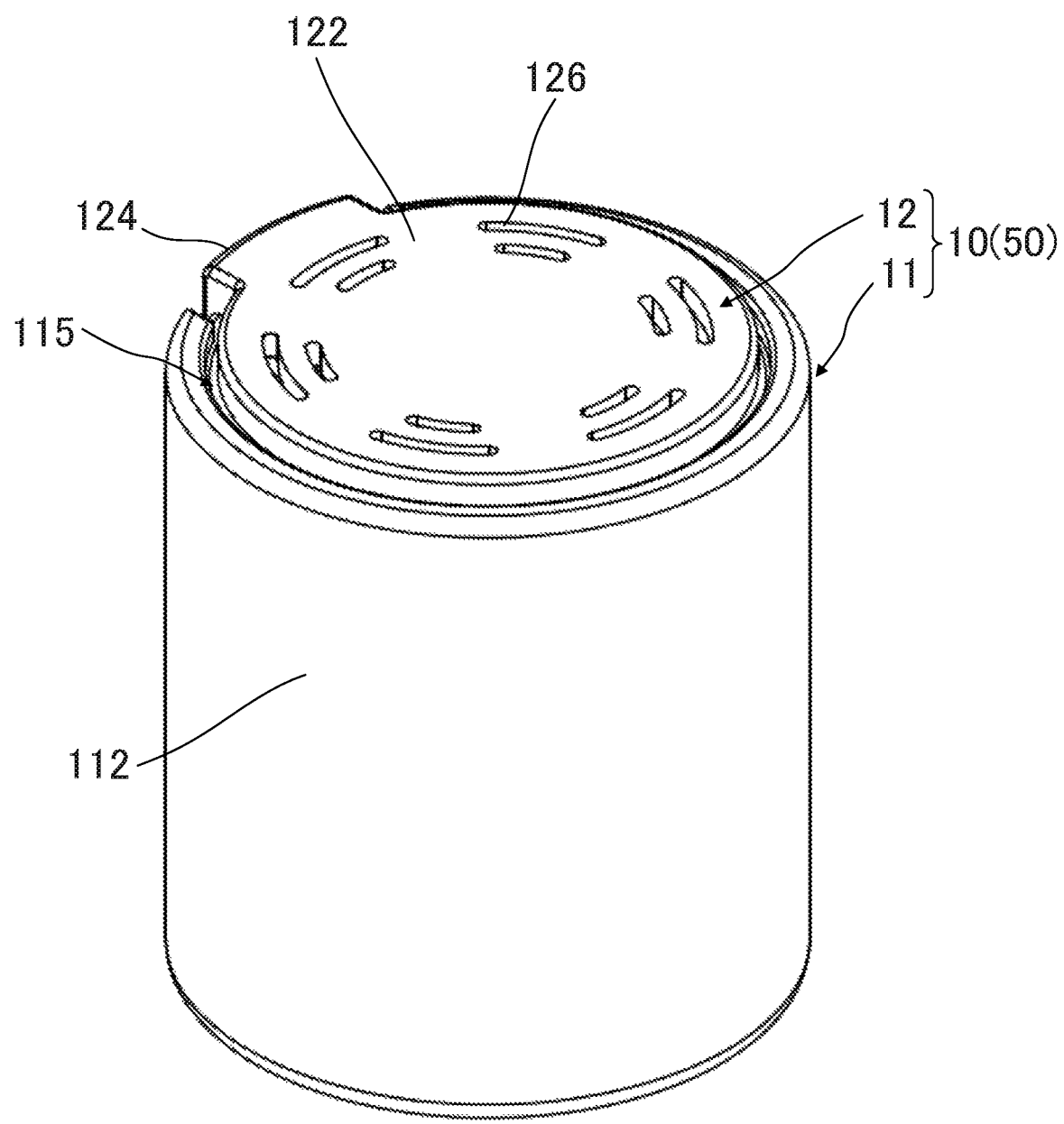
FIG. 1 is an external perspective view of a vibration actuator according to an embodiment of the present invention.
Figure 2:
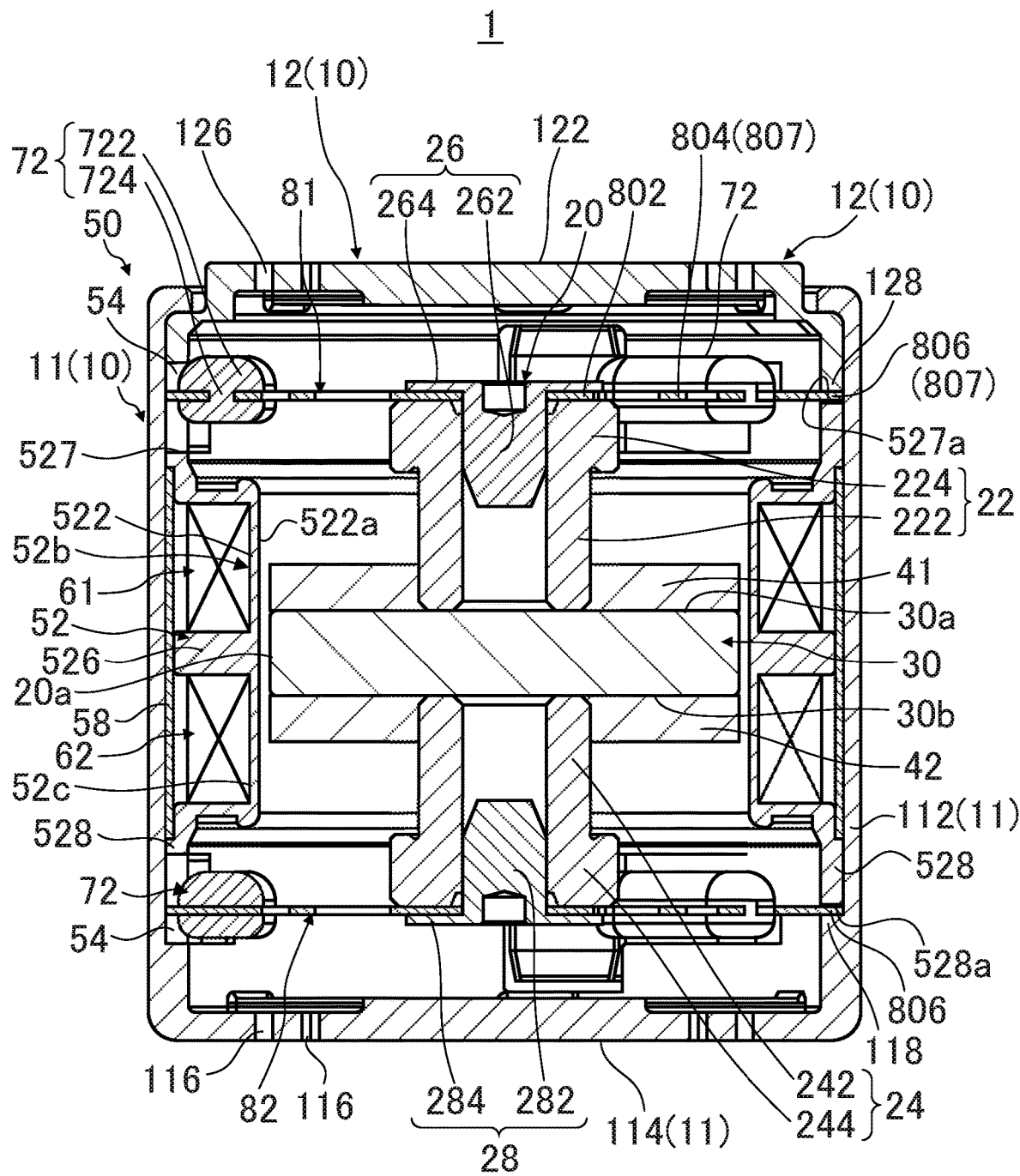
FIG. 2 is a longitudinal sectional view of the vibration actuator.
Figure 3:
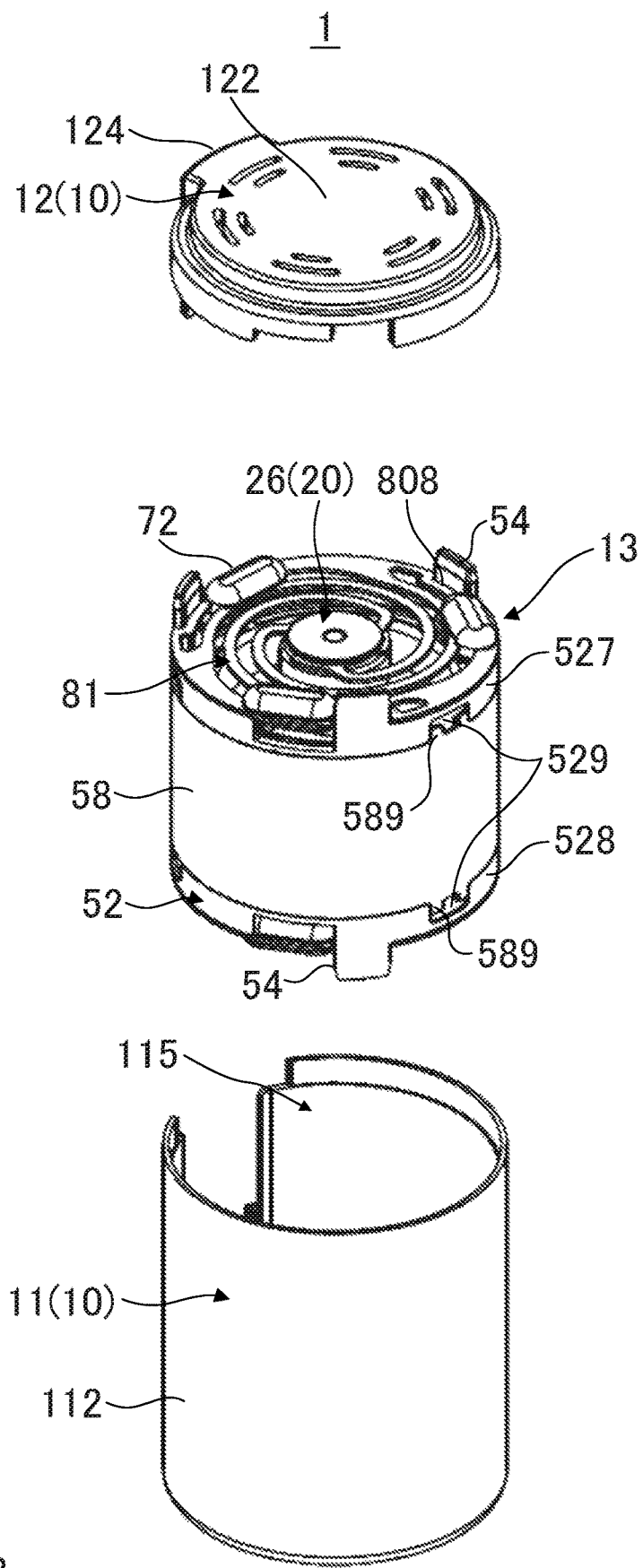
FIG. 3 is a perspective view of the vibration actuator from which a case is detached.
Figure 4:
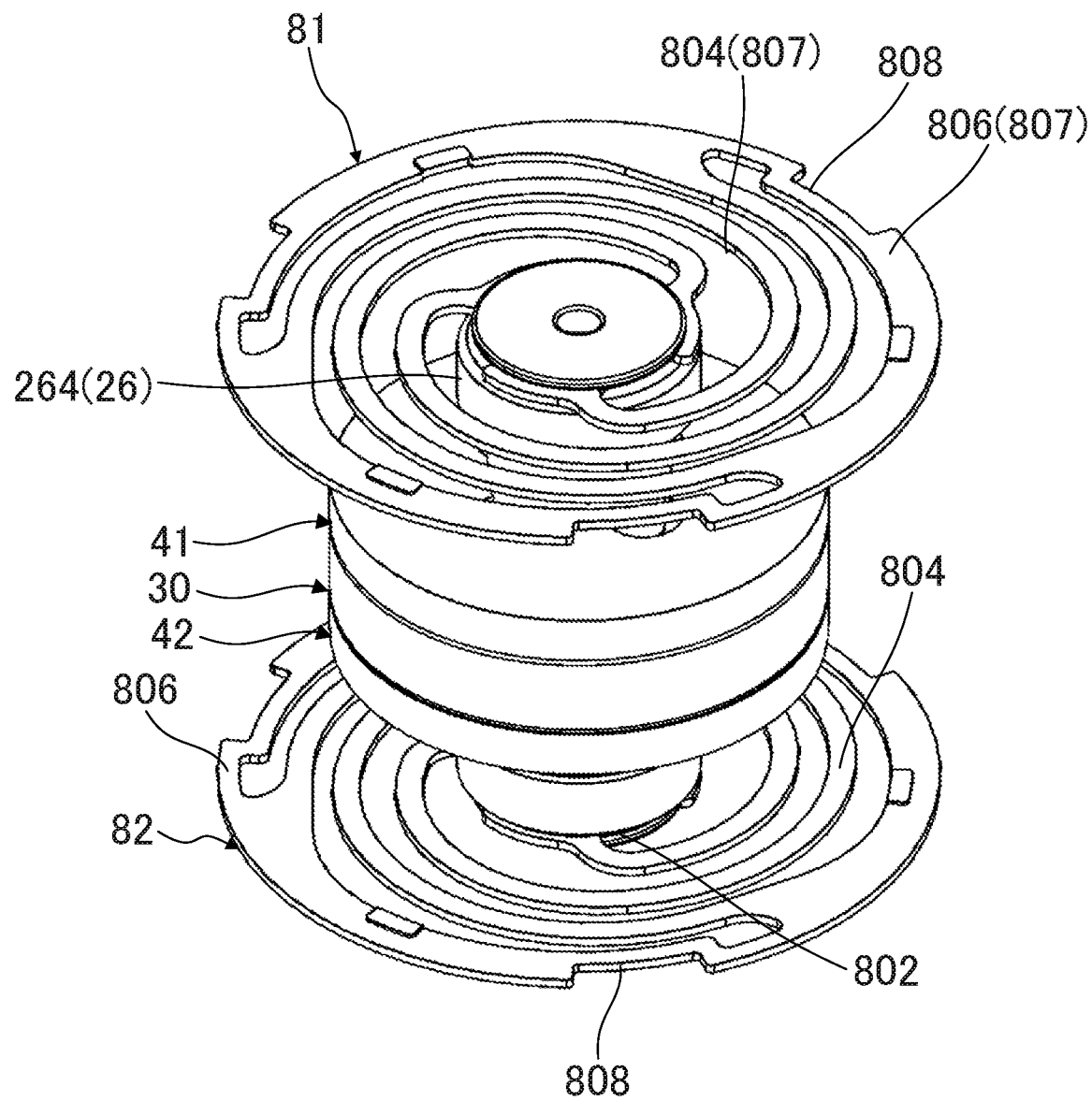
FIG. 4 is a perspective view of a movable body to which elastic supporting parts are fixed.
Figure 5:
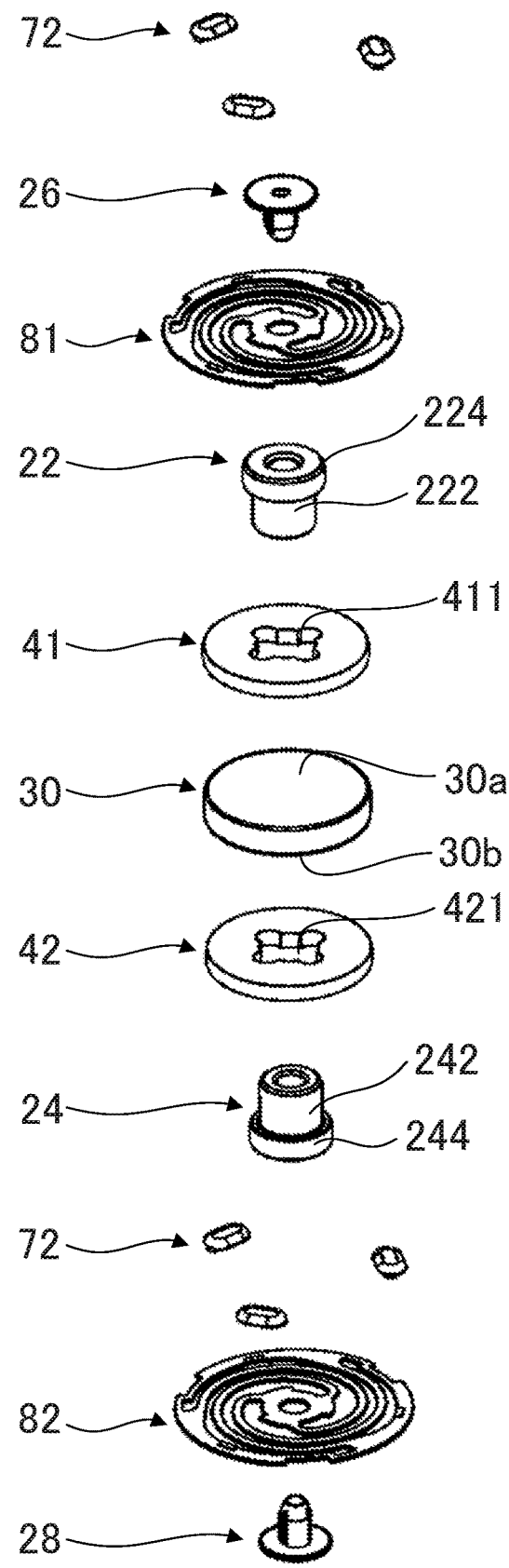
FIG. 5 is an exploded perspective view of the movable body and the elastic supporting parts.
Figure 6:
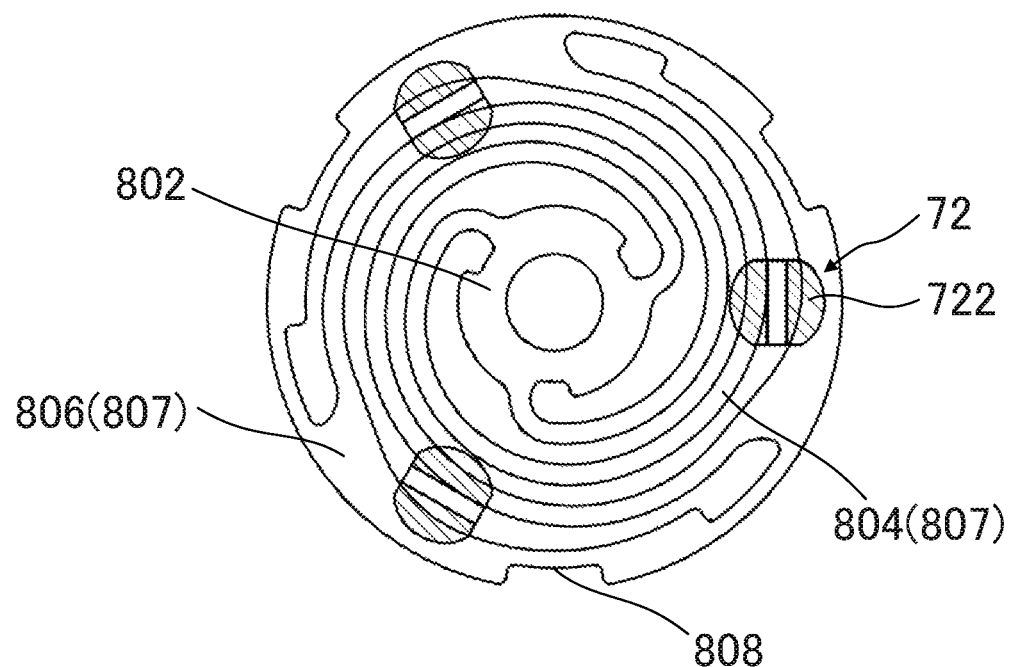
FIG. 6 is a plan view of one of the elastic supporting parts including damping parts.
Figure 7:
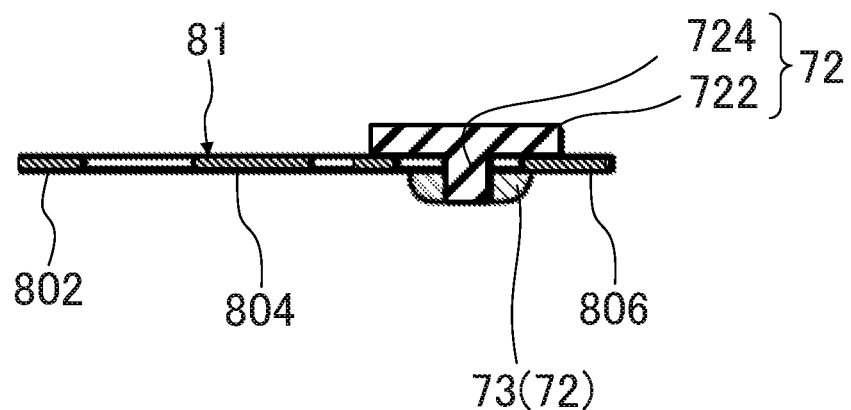
FIG. 7 is a partial sectional view of the elastic supporting part including the damping parts.
Figure 8:
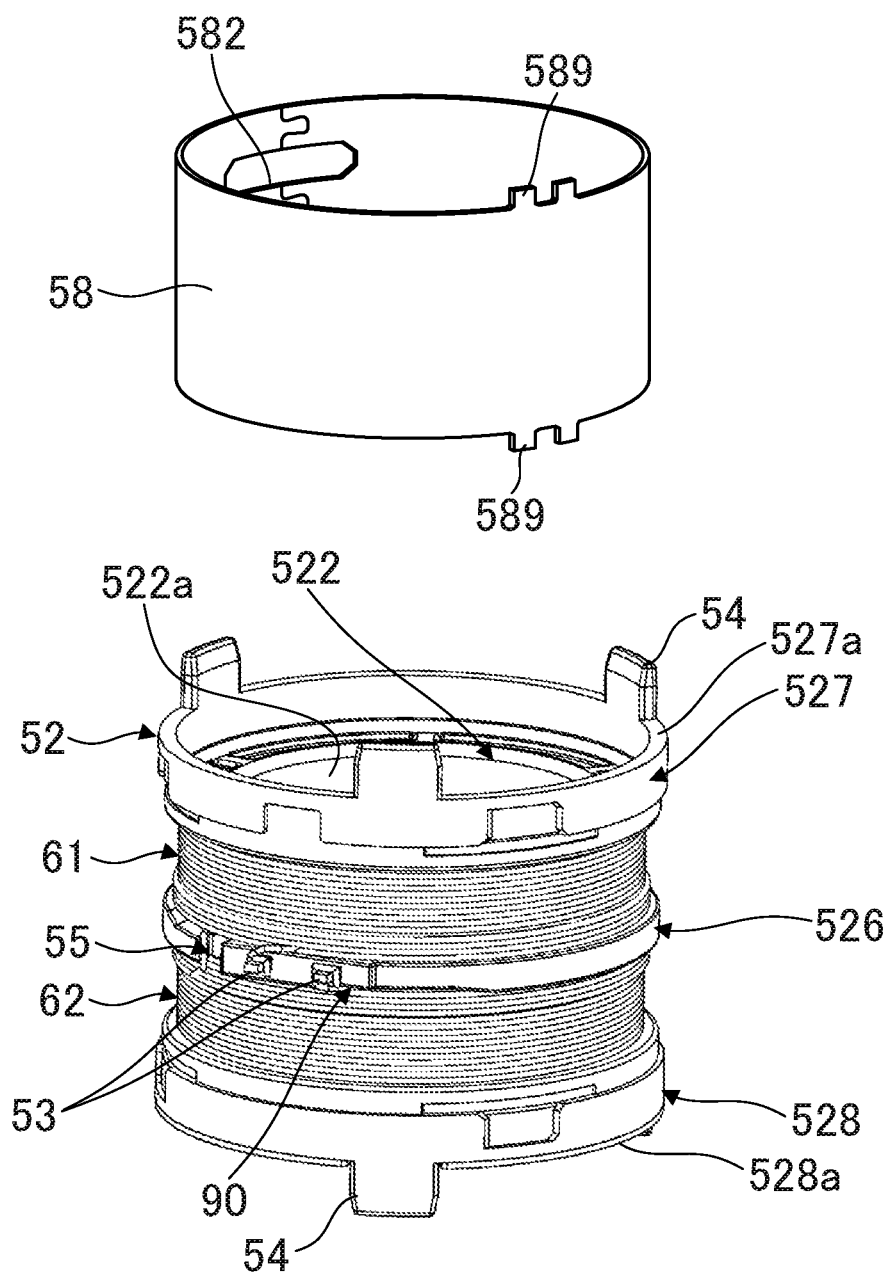
FIG. 8 illustrates a coil assembly with an electromagnetic shield part detached.
Figure 9:
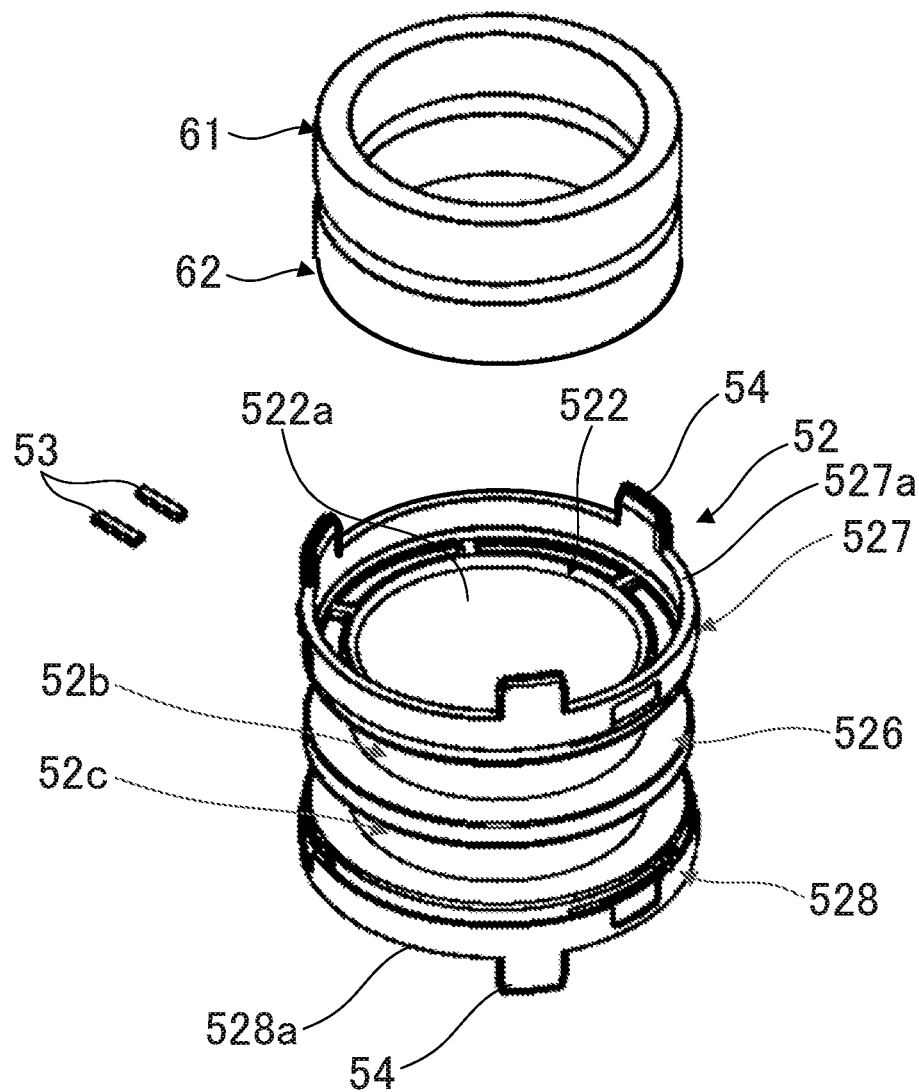
FIG. 9 is an exploded view of the coil assembly.

FIG. 1 is an external perspective view of a vibration actuator according to an embodiment of the present invention, FIG. 2 is a longitudinal sectional view of the vibration actuator, and FIG. 3 is a perspective view of the vibration actuator from which the case is detached. FIG. 4 is a perspective view of a movable body to which elastic supporting parts are fixed, and FIG. 5 is an exploded perspective view of the movable body and the elastic supporting parts. FIG. 6 is a plan view of one of the elastic supporting parts including damping parts, and FIG. 7 is a partial sectional view of the elastic supporting part including the damping parts. Further, FIG. 8 illustrates a coil assembly with an electromagnetic shield part detached, and FIG. 9 is an exploded view of the coil assembly. Note that the "upper" side and the "lower" side in the present embodiment are given for convenience of understanding, and mean one side and the other side in the vibration actuator of the movable body in the vibration direction. That is, when the vibration actuator is mounted on an electronic device (see FIGS. 35 and 36), the upper and lower sides may be reversed, or may also be left and right.

Vibration actuator 1 according to Embodiment 1 is mounted as a vibration source on an electronic device such as a portable game terminal device (for example, game controller GC illustrated in FIG. 35) to implement a vibration function of the electronic device. Examples of this electronic device include a portable device such as a smart phone (for example, mobile terminal M illustrated in FIG. 36). Vibration actuator 1 is mounted on a device such as a portable game terminal device or a portable device, and is driven to vibrate to notify a user of an incoming call or to give an operational feel or realism.

As illustrated in FIGS. 1 and 2, vibration actuator 1 of the present embodiment houses, in hollow case 10, movable body 20 such that movable body 20 is capable of vibrating in the axial direction (upper-lower direction) of case 10, which is the vibration direction, between upper and lower end surfaces. Movable body 20 movable inside case 10 allows vibration actuator 1 itself to function as a vibration body.

Vibration actuator 1 includes: movable body 20 including magnet 30 and movable-body cores 41 and 42; fixing body 50 including coils 61 and 62; and plate-like elastic supporting parts 81 and 82 for supporting movable body 20 such that the movable body freely reciprocates with respect to fixing body 50.

Coils 61 and 62, magnet 30, and movable-body cores 41 and 42 in vibration actuator 1 constitute a magnetic circuit for vibrating movable body 20. In vibration actuator 1, when coils 61 and 62 are energized from a power supplying section (e.g., drive control section 203 illustrated in FIGS. 35 and 36), coils 61 and 62 and magnet 30 cooperate to cause movable body 20 to reciprocate in the vibration direction within case 10.

In vibration actuator 1 of the present embodiment, bobbin main-body portion (coil protection wall portion) 522 disposed between movable body 20 and coils 61 and 62 allows movable body 20 to reciprocate in the axial direction of coils 61 and 62 (i.e., the vibration direction) inside coils 61 and 62 held by coil bobbin part 52. The axial direction of coils 61 and 62 is the vibration direction of movable body 20, is also the magnetization direction of magnet 30, and is also the axial direction of coil bobbin part 52.

Movable body 20 is disposed via elastic supporting parts 81 and 82 such that, in a non-vibration state in which movable body 20 is not moving, the center of the length of movable body 20 in the vibration direction and the center of the length of coil bobbin part 52 in the vibration direction face each other in a direction orthogonal to the axial direction of movable body 20 with a predetermined gap being interposed between the movable body and the coil bobbin part. At this time, it is desirable that movable body 20 be located at a position where movable body 20 is balanced between coils 61 and 62 without making contact with bobbin main-body portion 522 of coil bobbin part 52. In the present embodiment, it is preferable that the center of the length along magnet 30 and movable-body cores 41 and 42 in the vibration direction be disposed to face, in the direction orthogonal to the vibration direction, the center of the length of a space between vertically spaced coils 61 and 62 in the vibration direction. Note that, a magnetic fluid may be interposed between bobbin main-body portion 522 and movable body 20.

In the present embodiment, vibration actuator 1 is configured such that drive unit 13 including coils 61 and 62, coil bobbin part 52, movable body 20, and elastic supporting parts 81 and 82 is disposed in case 10 including case main body 11 and lid portion 12 as illustrated in FIG. 3.

<Movable Body 20>

Movable body 20 is supported inside cylindrical coil bobbin part 52 of fixing body 50 by elastic supporting parts 81 and 82 connected at the upper and lower end portions of the movable body, so as to be capable of reciprocating along inner circumferential surface 522a of bobbin main-body portion 522. In other words, in vibration actuator 1, movable body 20 is supported to be capable of reciprocating in a direction in which lid portion 12 and bottom portion 114 face each other. Movable body 20 is disposed in drive unit 13 illustrated in FIG. 3.

Movable body 20 includes magnet 30, movable-body cores 41 and 42, spring retaining parts 22 and 24, and fixation pins 26 and 28 as illustrated in FIGS. 2, 4 and 5. In the present embodiment, movable-body cores 41 and 42 and spring retaining parts 22 and 24 are continuously disposed respectively toward opposite sides from magnet 30 in the vibration direction (in the upper-lower direction in the figures). In movable body 20, outer circumferential surface 20a of magnet 30 and movable-body cores 41 and 42 is disposed inside inner circumferential surface 522a of bobbin main-body portion 522 to face inner circumferential surface 522a with a predetermined gap being interposed between the outer circumferential surface of the magnet and the movable-body cores and the inner circumferential surface of the bobbin main-body portion.

When movable body 20 moves in the vibration direction, movable body 20 reciprocates along inner circumferential surface 522a such that outer circumferential surface 20a does not make contact with inner circumferential surface 522a.

Magnet 30 is magnetized in the vibration direction. Magnet 30 is formed in a disk shape in the present embodiment, and front and back surfaces 30a and 30b distant from each other in the vibration direction respectively have different poles. Front and back surfaces 30a and 30b of magnet 30 are two magnetized surfaces distant from each other in the extending direction of the axes of coils 61 and 62.

Magnet 30 is disposed radially inside coils 61 and 62 (described in detail below) with a gap being interposed between the magnet and the coils. Here, the term "radially (radial direction)" means a direction orthogonal to the axes of coils 61 and 62, and also means the direction orthogonal to the vibration direction. This "gap" in the radial direction is a gap between magnet 30 and coils 61 and 62 including bobbin main-body portion 522, and is a gap allowing movable body 20 to move in the vibration direction of movable body 20 such that magnet 30 and coils 61 and 62 do not make contact with each other. That is, the "gap" means a predetermined gap between bobbin main-body portion 522 and magnet 30 in the present embodiment.

Magnet 30 is disposed to face, at the outside in the radial direction, the center of bobbin main-body portion 522 in the present embodiment. Note that, magnet 30 may have any other shape than the disk shape, such as a cylindrical shape, a plate-like shape, or the like as long as magnet 30 is disposed inside coils 61 and 62 such that the two magnetized surfaces face in the extending direction of the axes of coils 61 and 62. Further, it is desirable that the center of magnet 30 in the axial direction coincide with the center of movable body 20 in the axial direction.

Movable-body cores 41 and 42 are disposed respectively on front and back surfaces 30a and 30b of magnet 30.

Movable-body cores 41 and 42 are magnetic materials, function as a yoke, and constitute the magnetic circuit together with magnet 30 and coils 61 and 62. Movable-body cores 41 and 42 concentrate magnetic flux of magnet 30 to cause the magnetic flux to efficiently flow without leaking, so as to effectively distribute the magnetic flux flowing between magnet 30 and coils 61 and 62.

In addition to the function as a part of the magnetic circuit, movable-body cores 41 and 42 in movable body 20 have a function as a main-body part of movable body 20, a function of fixing spring retaining parts 22 and 24, and a function as a weight.

In the present embodiment, movable-body cores 41 and 42 are formed in an annular flat plate shape having the same surface shape as magnet 30. Movable-body cores 41 and 42 are fixed to magnet 30 such that the outer circumferential surfaces of movable-body cores 41 and 42 are flush with the outer circumferential surface of the magnet, and forms outer circumferential surface 20a of movable body 20 together with the outer circumferential surface of the magnet.

Movable-body cores 41 and 42 are the same similarly-formed members in the present embodiment, and are symmetrically disposed above and below magnet 30 so as to sandwich magnet 30. Note that, movable-body cores 41 and 42 are attracted to magnet 30, and also are fixed to magnet 30, for example, by a thermosetting adhesive such as an epoxy resin or an anaerobic adhesive.

Fitting openings 411 and 421 to which the upper and lower spring retaining parts 22 and 24 are fitted are formed in the respective central portions of movable-body cores 41 and 42. Fitting openings 411 and 421 are disposed such that the respective axes of upper and lower spring retaining parts 22 and 24, i.e., the central axes of elastic supporting parts 81 and 82 are located on the central axis of movable body 20. Fitting openings 411 and 421 make contact with inserted spring retaining parts 22 and 24 at three or four points for fixing them accurately on their axes, so as to support upper and lower spring retaining parts 22 and 24 such that spring retaining parts 22 and 24 are located on the axis of movable body 20. In fitting openings 411 and 421, the degrees of openings in movable-body cores 41 and 42 are adjustable for adjusting the weight of movable body 20, so that a preferable vibration output can be set.

In the present embodiment, movable-body cores 41 and 42 are located inside (radially inside) coils 61 and 62 to respectively face coils 61 and 62 in the direction orthogonal to the axial direction of coils 61 and 62 in the non-vibration state of movable body 20.

Movable-body cores 41 and 42, together with magnet 30, constitute a movable-body-side magnetic circuit. In the present embodiment, it is preferable that the height position of the upper surface of movable-body core 41 on the upper side of magnet 30 face the position of the center of upper coil 61 in the height direction (upper-lower direction). In addition, it is preferable that the height position of the lower surface of movable-body core 42 on the lower side of magnet 30 face the position of the center of lower coil 62 in the height direction (upper-lower direction).

Spring retaining parts 22 and 24 have a function of fixing the movable-body-side magnetic circuit to elastic supporting parts 81 and 82, and a function as a weight of movable body 20. Spring retaining parts 22 and 24 are symmetrically disposed to sandwich magnet 30 and movable-body cores 41 and 42, and increase the vibration output of movable body 20.

Spring retaining parts 22 and 24 are a shaft-like body disposed along the central axis of movable body 20 in the present embodiment, and are interposed between movable-body cores 41 and 42 and elastic supporting parts 81 and 82.

Spring retaining parts 22 and 24 are formed in the same shape in the present embodiment, and have joint portions 222 and 242 and spring fixation portions 224 and 244. These joint portions 222 and 242 and spring fixation portions 224 and 244 are continuously formed in the vibration direction (specifically, in the upper-lower direction).

Each of spring retaining parts 22 and 24 has a through hole extending through the spring retaining part. Note that, spring retaining parts 22 and 24 may function as a weight adjusting part that adjusts the weight by addition of a weight in the through hole. It is possible to increase the vibration output of movable body 20 by making movable body 20 heavier by adding a weight in the through hole.

Joint portions 222 and 242 are joined to movable-body cores 41 and 42, respectively. Specifically, joint portions 222 and 242 are, at one end side, inserted in and fitted internally to fitting openings 411 and 421 of movable-body cores 41 and 42, respectively. Spring retaining parts 22 and 24 are fixed to movable-body cores 41 and 42 by press-fitting in the present embodiment, but the present invention is not limited thereto, and spring retaining parts 22 and 24 may also be fixed, for example, by adhesion using a thermosetting adhesive such as epoxy resin or an anaerobic adhesive.

Upper spring fixation portion 224 forms one end portion of movable body 20 in the vibration direction, that is, the upper end portion of movable body 20, and is joined to inner circumferential portion 802, which is an inner-diameter-side end portion of an upper leaf spring serving as elastic supporting part 81. Meanwhile, lower spring fixation portion 244 forms the other end portion of movable body 20 in the vibration direction, that is, the lower end portion of movable body 20, and is joined to inner circumferential portion 802, which is an inner-diameter-side end portion of a lower leaf spring serving as elastic supporting part 82.

Spring fixation portions 224 and 244 are disposed to protrude upward and downward from joint portions 222 and 242, respectively, and are, at their tips, joined to inner circumferential portions 802 and 802 of elastic supporting parts 81 and 82 via fixation pins 26 and 28, respectively.

Fixation pins 26 and 28 firmly fix together elastic supporting parts 81 and 82 and movable body 20 such that they do not come off each other by the vibration of movable body 20.

Fixation pins 26 and 28 are formed in the same shape in the present embodiment, and respectively have shaft-shaped pin main bodies 262 and 282 that can be press-fitted into spring fixation portions 224 and 244, and flanges 264 and 284 formed on the edges of pin main bodies 262 and 282 on one end side.

Specifically, respective pin main bodies 262 and 282 of fixation pins 26 and 28 are fixed by press-fitting via the openings of inner circumferential portions 802 into the through holes of spring fixation portions 224 and 244 in a state where respective inner circumferential portions 802 of elastic supporting parts 81 and 82 are stacked on spring fixation portions 224 and 244. Thus, flanges 264 and 284, together with spring fixation portions 224 and 244, clamp and firmly join inner circumferential portions 802 of elastic supporting parts 81 and 82. Note that, inner circumferential portions 802 of elastic supporting parts 81 and 82 and spring fixation portions 224 and 244 may be joined by welding, bonding, caulking, or the like, or by a combination of welding, bonding, or caulking.

Since in movable body 20, spring retaining parts 22 and 24 are disposed at opposite end portions (upper and lower end portions) distant from each other with respect to the movable-body-side magnetic circuit in the vibration direction, the weight in movable body 20 is not disposed on the outer circumferential side of the movable body magnetic circuit. Thus, the arrangement space for coils 61 and 62 located to face each other on the outer circumferential side of the movable-body-side magnetic circuit (i.e., on the outer circumferential side of movable body 20) is not limited. That is, the distance between the movable-body magnetic circuit and coils 61 and 62 does not increase, so that the efficiency in electromagnetic conversion is not reduced. Accordingly, it is possible to preferably increase the weight of movable body 20, so as to achieve a higher vibration output.

In addition, since spring retaining parts 22 and 24 have the function as a weight and the function of spring fixation, it is not necessary to assemble individual members respectively having these functions. Only by disposing spring retaining parts 22 and 24 in the movable-body-side magnetic circuit, the weight and the upper and lower leaf springs being elastic supporting parts 81 and 82 can be easily attached to movable body 20, so that the assemblability is enhanced.

Note that, while spring retaining parts 22 and 24 may be formed from a magnetic material, it is desirable that spring retaining parts 22 and 24 be formed from a non-magnetic material. When spring retaining parts 22 and 24 are formed from a non-magnetic material, no magnetic flux from movable-body core 41 flows upward and no magnetic flux from movable-body core 42 flows downward, so that it is possible to cause the magnetic flux to flow toward coils 61 and 62 located on the outer circumferential side of movable-body cores 41 and 42 efficiently.

Further, it is preferable that spring retaining parts 22 and 24 be formed from a material having a higher specific gravity (e.g., the specific gravity as high as about 16 to 19) than a material of a silicon steel plate or the like (the specific gravity of the steel plate is 7.70 to 7.98). For example, tungsten can be applied as the material of spring retaining parts 22 and 24. Thus, even when the outer dimensions of movable body 20 are set in a design or the like, it is possible to relatively easily increase the mass of movable body 20, so as to achieve a desired vibration output producing a sufficient tactile vibration for the user.

<Fixing Body 50>

Fixing body 50 holds coils 61 and 62, and supports, via elastic supporting parts 81 and 82, movable body 20 inside coils 61 and 62 in the radial direction such that movable body 20 is freely movable in the vibration direction (the coil-axis direction, the axial direction of movable body 20).

Fixing body 50 includes case 10, coils 61 and 62, coil bobbin part 52, and electromagnetic shield part 58.

Coil bobbin part 52 holds coils 61 and 62 wound on the outer circumferential surface the coil bobbin part, surrounds magnet 30 by inner circumferential surface 522a, and guides the movement of movable body 20 including magnet 30.

Coil bobbin part 52 is a cylindrical body formed from a resin such as a phenolic resin, poly butylene terephthalate (PBT), or the like. In the present embodiment, coil bobbin part 52 is formed from a material containing a phenolic resin such as Bakelite having high flame retardancy.

When coil bobbin part 52 is formed from a material containing a phenolic resin, a higher flame retardancy is obtained, so that it is possible to improve the safety at the time of driving even when heat is generated by Joule heat when a current flows through coils 61 and 62 held by coil bobbin part 52. Moreover, the dimensional accuracy is increased and the positional accuracy of coils 61 and 62 is increased accordingly, so that it is possible to reduce variations in vibration characteristics.

Coil bobbin part 52 includes cylindrical bobbin main-body portion 522, flange portions 526 to 528 protruding from the outer circumference of bobbin main-body portion 522 in the radial direction, terminal tying parts (coil connection parts) 53, movable-range forming parts 54, and linking groove portion 55.

In coil bobbin part 52, coils 61 and 62 are wound between flange portions 526 to 528 (on coil attachment portions 52b and 52c). Coils 61 and 62 are covered by electromagnetic shield part 58 positioned via terminal bringing-out portion 90 and positioning engagement portions 529 of coil bobbin part 52. Note that, terminal tying parts (coil connection parts) 53 may also be illustrated and described as terminal tying parts (coil connection parts) 53-1 and 53-2, for convenience.

Inner circumferential surface 522a of bobbin main-body portion 522 is disposed to face the outer circumferential surface of movable body 20 with a predetermined gap being interposed between the inner circumferential surface of the bobbin main-body portion and the outer circumferential surface of the movable body. This predetermined gap is a gap allowing movable body 20 to move in the axial direction, which is the vibration direction, without making contact with inner circumferential surface 522a when movable body 20 moves in the vibration direction. Bobbin main-body portion 522 is configured to inhibit contact between magnet 30 and coils 61 and 62. Movable body 20 is capable of reciprocating along inner circumferential surface 522a without making contact with inner circumferential surface 522a.

Bobbin main-body portion 522 functions as a protective wall portion for protecting coils 61 and 62 against collision by movable body 20 when movable body 20 disposed inside is being driven. The thickness of bobbin main-body portion 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of bobbin main-body portion 522 in such a manner as to be lie side-by-side in the coil-axis direction and to surround the outer circumferential surfaces of movable-body cores 41 and 42 of movable body 20 (the outer circumferential surface of magnet 30 and movable-body cores 41 and 42).

Specifically, flange portions 526 to 528 and recessed coil attachment portions 52b and 52c that open radially outward on the outer circumferential side (see FIGS. 2 and 9) are disposed on and in the outer circumferential surface of bobbin main-body portion 522.

Coil attachment portions 52b and 52c are disposed to be demarcated by flange portions 526 to 528. Coils 61 and 62 are wound on coil attachment portions 52b and 52c between flange portions 527 and 528, so as to sandwich flange portion (central wall portion; hereinafter, also referred to as "central flange portion") 526 in the vibration direction.

Central flange portion 526 is formed annularly, and includes a circular outer circumferential portion.

Routing part 9 that has a function of routing a coil winding and terminating the end portions of the coil is disposed in a part of the outer circumferential portion of central flange portion 526.

Routing part 9 includes terminal bringing-out portion 90 in which terminal tying parts 53 are disposed, and linking groove portion 55 in which the coil winding that links coils 61 and 62 is disposed.

Terminal tying parts 53 function as a connector connection portion to which the coil winding of coils 61 and 62 is tied for connection to an external device as illustrated in FIGS. 8, 9, 15 and 16. Terminal tying parts 53 connect coils 61 and 62 to the external device (e.g., the power supplying section such as the drive control section), and power is supplied to coils 61 and 62.

Terminal tying parts 53 are electrically conductive members disposed to protrude from the outer circumferential portion of bobbin main-body portion 522, and each have a rod-like body in the present embodiment. In the present embodiment, terminal tying parts 53 are disposed on the outer circumferential portion of coil bobbin part 52. Specifically, terminal tying parts 53 are disposed, by press-fitting of their base end portions to central flange portion 526, on the outer circumferential surface of central flange portion 526 disposed centrally in the vibration direction.

Terminal tying parts 53 are disposed in terminal bringing-out portion 90 protruding from the outer circumferential surface of flange portion 526 disposed centrally in the vibration direction in vibration actuator 1.

In terminal bringing-out portion 90, the end portions of the coil winding that forms coils 61 and 62 are brought out of vibration actuator 1 via terminal tying parts 53.

Terminal bringing-out portion 90 protrudes from the outer circumferential surface of central flange portion 526, and has a predetermined length in the radial direction, a thickness in the vibration direction, and a width in the circumferential direction, so as to ensure a margin for press-fitting of terminal tying parts 53 in flange portion 526. Thus, terminal bringing-out portion 90 can firmly hold terminal tying parts 53, and allows stable fixation when terminal tying parts 53 are attached to coil bobbin part 52.

Figure 17:
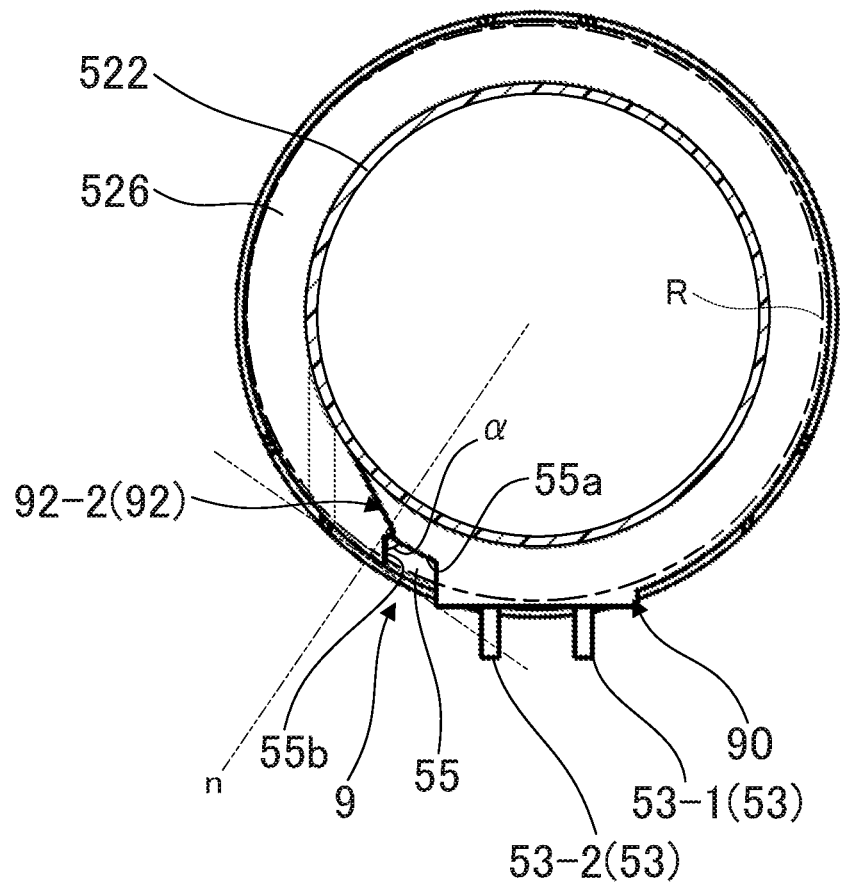
FIG. 17 is a cross-sectional view taken along line A-A and seen in a direction of arrows A in FIG. 16.

In the present embodiment, terminal bringing-out portion 90 protrudes outward from outer diameter R of central flange portion 526 as illustrated in FIG. 17. Terminal tying parts 53 are disposed in this outwardly-protruding portion to protrude outward.

Terminal bringing-out portion 90 and terminal tying parts 53 protrude outward from outer diameter R. It is thus possible to prevent terminal tying parts 53 from making contact with electromagnetic shield part 58 disposed to surround coil bobbin part 52 after assembly. Note that, electromagnetic shield part 58 will be described in detail later. Further, terminal bringing-out portion 90 is fitted into opening portion 582 in electromagnetic shield part 58 in the present embodiment. Thus, terminal bringing-out portion 90 functions as a stop against rotation of electromagnetic shield part 58.

Terminal bringing-out portion 90 is disposed close to (here, adjacently to) linking groove portion 55 on central flange portion 526.

The coil winding that links coils 61 and 62 together is inserted through linking groove portion 55. In linking groove portion 55 of the present embodiment, the winding direction of the coil winding forming coils 61 and 62 is reversed such that the winding direction of the coil winding above linking groove portion 55 is opposite to the winding direction of the coil winding below linking groove portion 55.

Linking groove portion 55 opens radially outward in the outer circumferential portion of central flange portion 526, and is formed into the shape of a cutout space to extend through in the vibration direction. Specifically, linking groove portion 55 at least includes bottom wall portion 55a forming a groove-shaped bottom, and far side wall portion (one side wall portion) 55b that is far from terminal tying parts 53 at bottom wall portion 55a. Linking groove portion 55 includes a cutout portion formed by bottom wall portion 55a and far side wall portion 55b. The cutout portion has a function of locking the winding to prevent the winding from coming off when, after one of coil 61 and coil 62 is wound and disposed, the other coil is then wound and disposed in the reversed direction. Linking groove portion 55 of the present embodiment as seen in plan view is formed in a U shape by a bottom surface of bottom wall portion 55 and opposite sidewall portions erected at opposite ends spaced apart from each other in the circumferential direction.

In linking groove portion 55 seen in plan view, far side wall portion 55b that is far from terminal tying parts 53 is formed to be located to form an acute angle on the side of terminal tying parts 53 with respect to normal n to the outer circumferential surface of outer diameter R of central flange portion 526, which normal n extends through a joint portion between far side wall portion 55b and bottom wall portion 55a as illustrated in FIG. 17. Thus, in linking groove portion 55, angle α formed by far side wall portion 55b that is far from terminal tying parts 53 and by bottom wall portion 55a is formed to be an acute angle on the side of terminal tying parts 53 with respect to normal n.

Accordingly, when coils 61 and 62 are disposed by winding the coil winding on coil attachment portions 52b and 52c in the directions reverse between the upper and lower coil attachment portions, the coil winding is securely engaged with linking groove portion 55 so as not to come off linking groove portion 55, and is preferably guided to desired coil attachment portions 52b and 52c. It is thus possible to easily attach coils 61 and 62 to coil bobbin part 52.

Further, routing part 9 includes coil guide portion 92 for guiding the coil winding from terminal tying parts 53 to a first winding position (e.g., corner portion) in a coil winding portion (one of coil attachment portions 52b and 52c) of coil bobbin part 52 in central flange portion 526.

Coil guide portion 92 is disposed in at least one surface of the upper and lower surfaces of central flange portion 526 (surfaces distant from each other in the vibration direction). In the present embodiment, coil guide portions 92 are formed respectively in portions of central flange portion 526 which are located on opposite sides of and adjacently to terminal bringing-out portion 90 and linking groove portion 55 in the circumferential direction.

Coil guide portions 92 respectively link, via inclined portions 93 formed by level differences at the upper and lower surfaces of central flange portion 526, terminal tying parts 53 with joint portions between central flange portion 526 and the outer circumferential surface of bobbin main-body portion 522 in coil attachment portions 52b and 52c.

Figure 18:
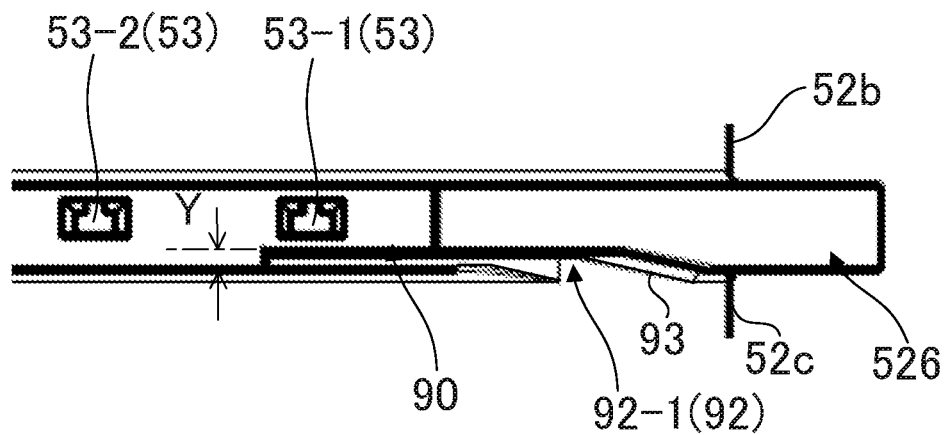
FIG. 18 is an enlarged view of part X of FIG. 16.
Figure 19:
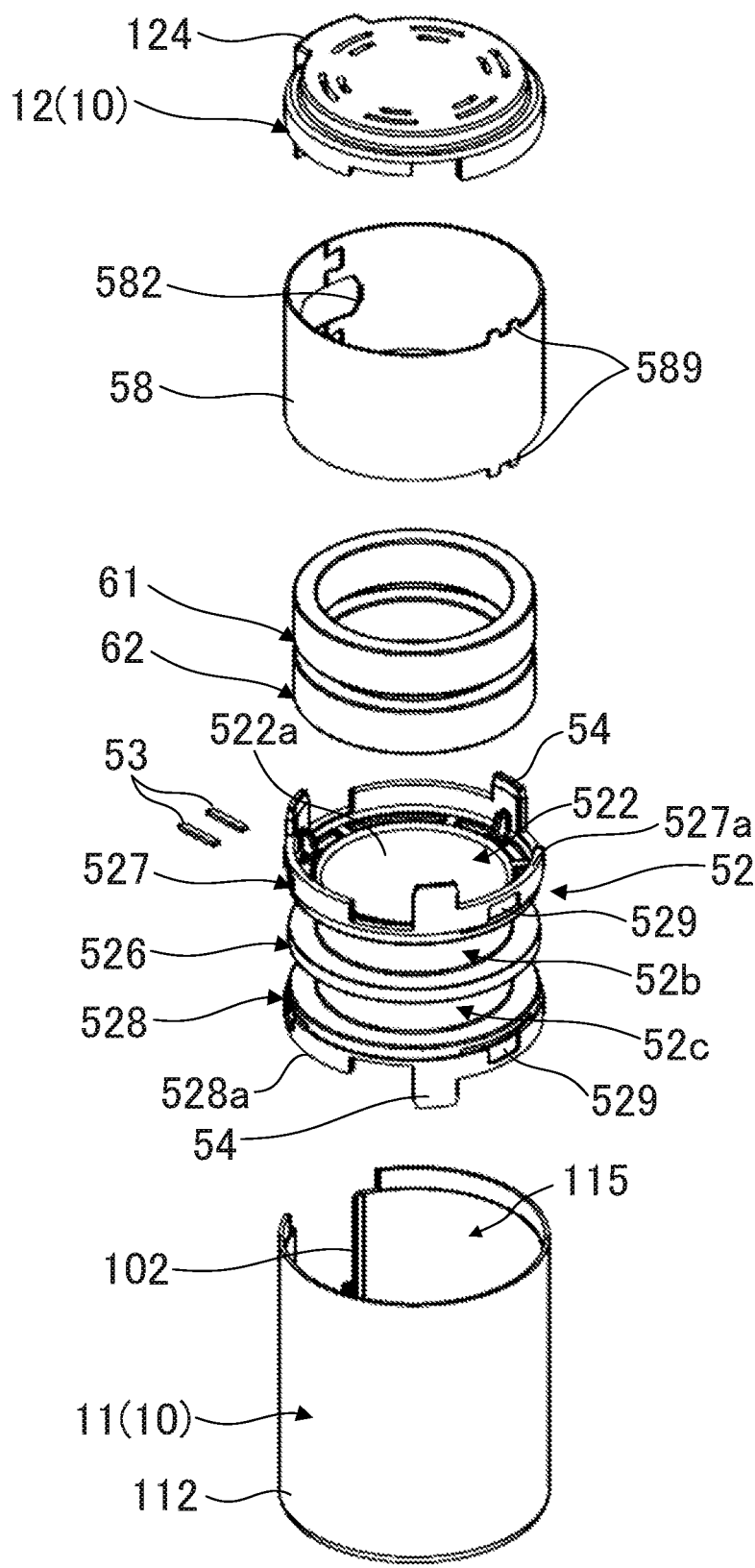
FIG. 19 is an exploded perspective view illustrating a relationship between the coil assembly and the case for explaining a winding bringing-out portion including the terminal tying parts.

FIG. 18 illustrates coil guide portion 92-1 of coil guide portions 92 for guidance in coil attachment portion 52c from coil attachment portion 52c to terminal tying part 53-1. Level difference Y is a level difference between, on the one hand, a height level of central flange portion 526 that is substantially the same height position as a joint position between the central flange portion and the outer circumferential surface of bobbin main-body portion 522 (see FIG. 15) in coil attachment portion 52c (height level of the upper surface of central flange portion 526) and, on the other hand, a height-level position that is lower than this height level and closer to terminal tying parts 53.

Each inclined portion 93 includes, because of level difference Y, a level-difference surface between the upper surface of central flange portion 526 and the surface at the height-level position close to terminal tying parts 53. The level-difference surface is disposed to rise from the surface at the height-level position close to one of terminal tying parts 53, and is inclined toward the bottom side of coil attachment portion 52b or 52c while extending in the circumferential direction from the base-end side of terminal tying part 53.

In coil guide portion 92-1 in FIG. 18, for example, the coil winding is tied to terminal tying part 53-1, and inclined portion 93 then guides the coil winding toward coil attachment portion 52c of coil bobbin part 52 such that the coil winding is drawn onto coil attachment portion 52c of coil bobbin part 52. It is thus possible to stabilize the first winding position to dispose coil 62 more preferably than in a case where the coil winding is directly drawn from terminal tying part 53-1 onto coil attachment portion 52c.

Coil guide portions 93 allow stabilization of the first winding position on coil attachment portions 52b and 52c during winding of the coil winding from terminal tying parts 53 onto coil attachment portions 52b and 52c, so as to reduce problems in processes.

Thus, the processes of tying the winding to terminal tying parts 53, forming the upper and lower coils, and, finally, tying the winding to terminal tying parts 53 are serially and fluently performed, and vibration actuator 1 can then be assembled. It is thus possible to achieve a vibration actuator in which the coil forming processes and the like can easily be automated and which has a structure for efficient assembly.

Figure 16:
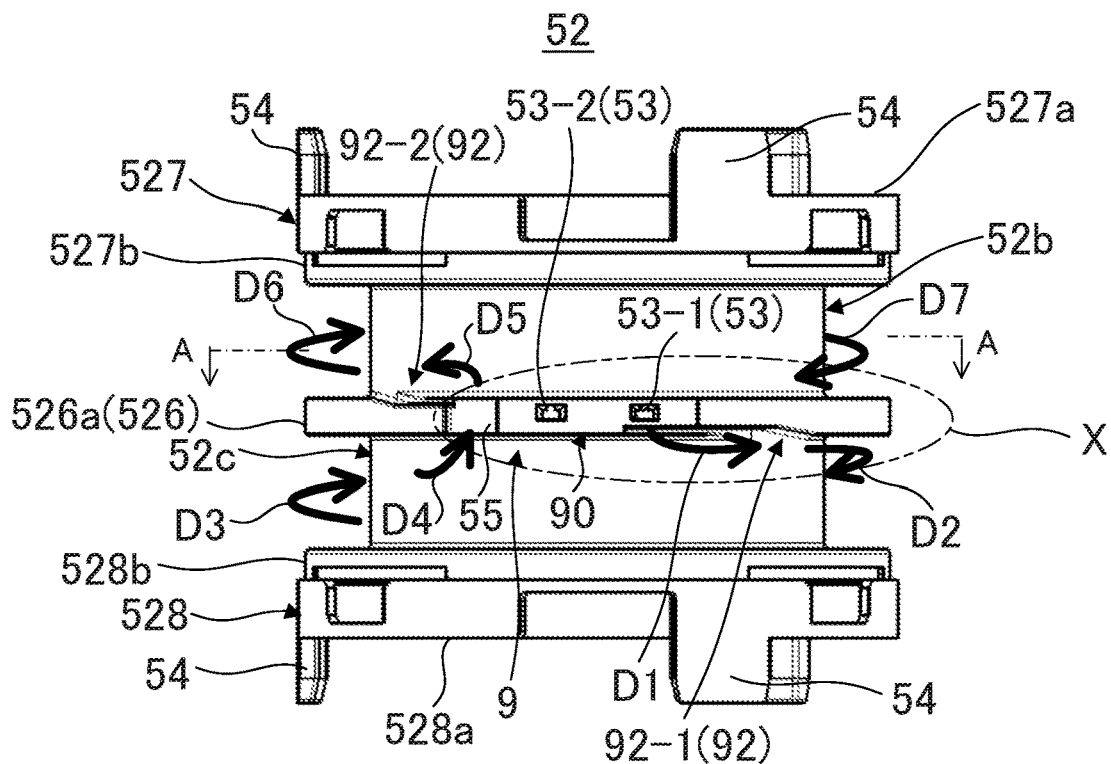
FIG. 16 is a side view of the coil bobbin part as seen from the side of the terminal tying parts.
Figure 20:
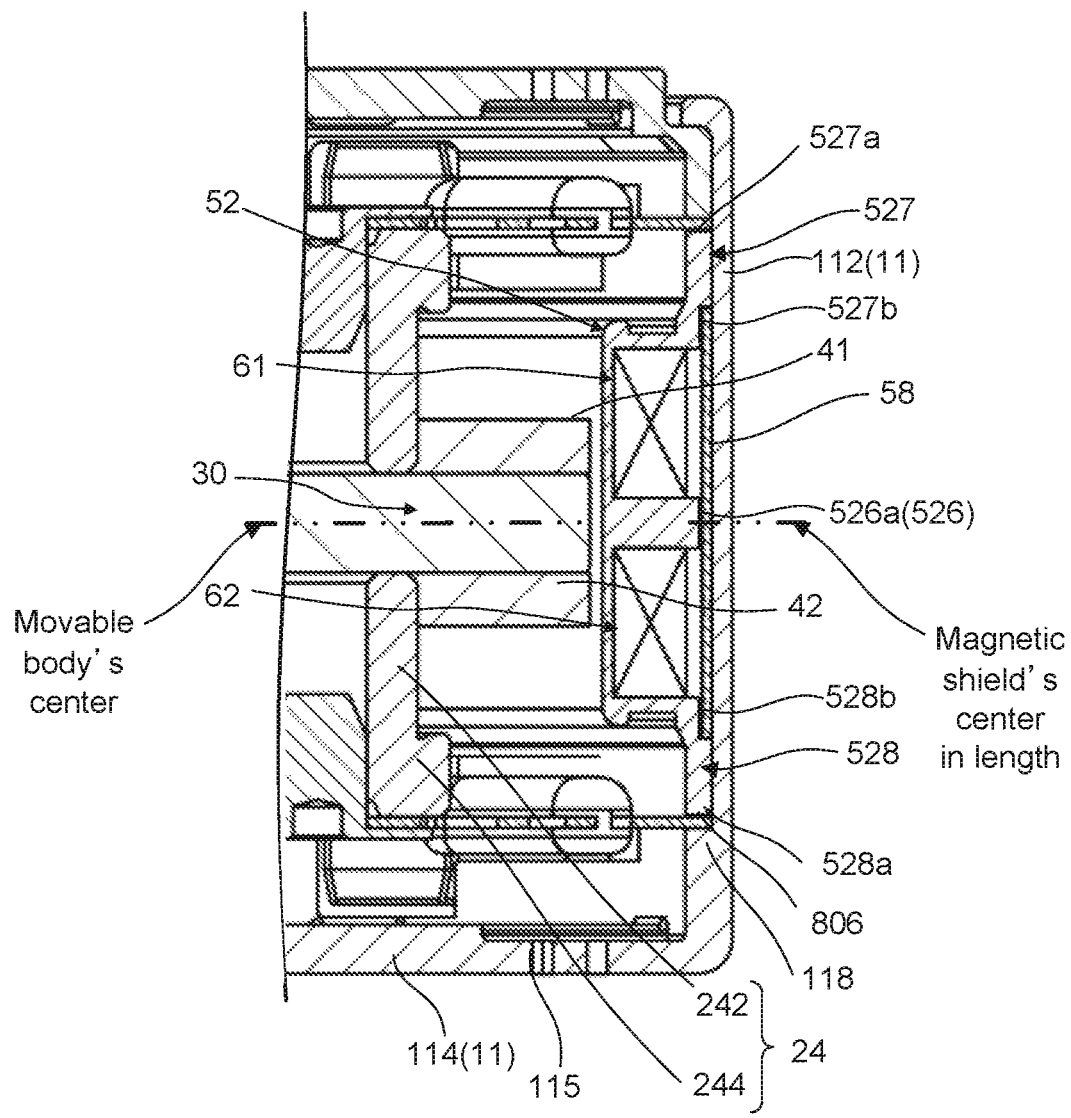
FIG. 20 is a sectional view illustrating a contact portion between a coil bobbin and the electromagnetic shield part in the coil assembly.

Flange portions 527 and 528 are disposed respectively on opposite end portions of bobbin main-body portion 522 which are distant from each other in the axial direction of the bobbin main-body portion (which is also the vibration direction and the upper-lower direction in the present embodiment), so as to form the upper and lower end portions of coil bobbin part 52. Flange portions 527 and 528 (also referred to as "opposite-end flange portions," collectively, and also referred to as "end flange portion," individually) are disposed on the opposite end portions in the vibration direction to project in the radial direction from the outer circumference of bobbin main-body portion 522. Opposite-end flange portions 527 and 528 include same outer-diameter portions (same diameter portions) 527b and 528b having the same outer diameter as outer circumference portion 526a of central flange portion 526 as illustrated in FIGS. 16 and 20, and make contact, at these same diameter portions, with the inner circumference surface of electromagnetic shield part 58.

In coil bobbin part 52, outer circumferential portion 526a of central flange portion 526 and same-diameter portions 527b and 528b of flange portions 527 and 528 form a recessed portion opening in the radial direction, in which electromagnetic shield part 58 is fitted. Electromagnetic shield part 58 is disposed in the recessed portion, so as to be positioned to surround coils 61 and 62. Further, electromagnetic shield part 58 makes contact with outer circumferential portion 526a and same-diameter portions 527b and 528b of flange portions 527 and 528 so as to be stably fixed to coil bobbin part 52. Electromagnetic shield part 58 can stably be fixed even when the height dimension (length in the vibration direction) of electromagnetic shield part 58 is large.

Elastic supporting parts 81 and 82 are fixed to end portions of flange portions 527 and 528 on the sides away from flange portion 526 (upper and lower end portions in the present embodiment).

Movable-range forming parts 54 are disposed on the upper and lower end portions of coil bobbin part 52, and form a vibration range between lid portion 12 and bottom portion 114 of case 10 and movable body 20 when coil bobbin part 52 is housed in case 10.

Movable-range forming parts 54 are protruding side portions that are formed to protrude from each of flange portions 527 and 528 in the vibration direction (upper-lower direction). Movable-range forming parts 54 are disposed at predetermined intervals on upper and lower annular opening end surfaces (also referred to as "upper end surface and lower end surface" respectively) 527a and 528a of flange portions 527 and 528. Upper end surface 527a is an opening end surface on one side, and lower end surface 528a is an opening end surface on the other side.

Flange portion 527 includes a top-surface bearing portion (a bearing portion) that includes protruding movable-range forming parts 54 protruding in the vibration direction and bears lid portion 12 via movable-range forming parts 54. Flange portion 528 includes a bottom-surface bearing portion (a bearing portion) that includes protruding movable-range forming parts 54 protruding in the vibration direction and bears bottom portion 114 via movable-range forming parts 54.

Figure 21:
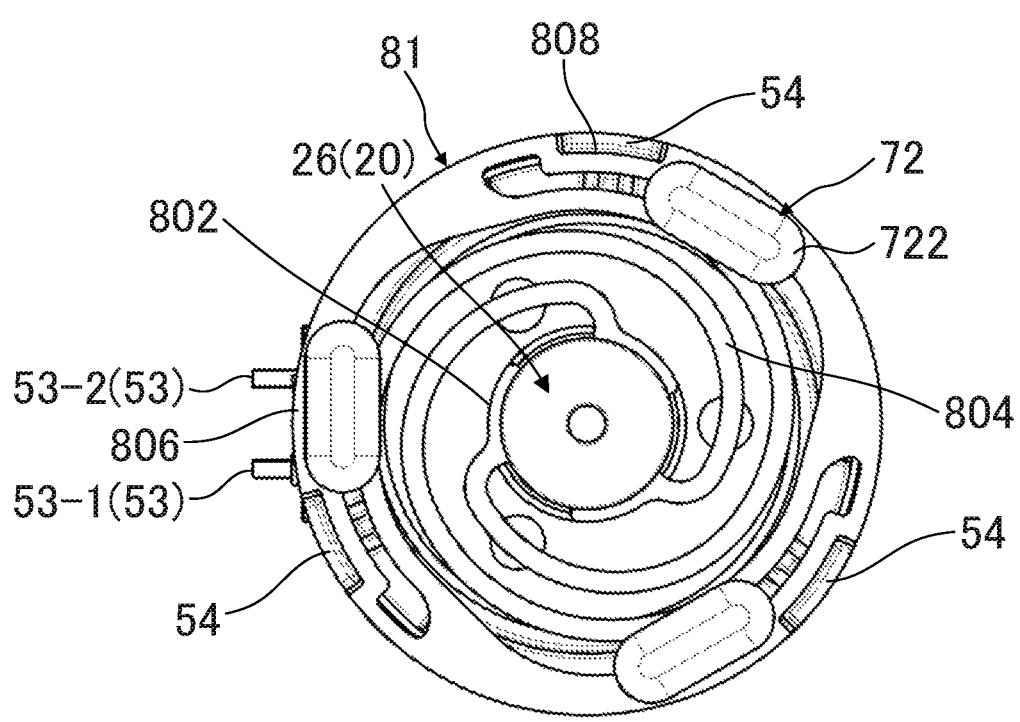
FIG. 21 is a plan view of the coil assembly illustrated in FIG. 3.

Further, movable-range forming parts 54 are fitted into positioning grooves 808 formed in elastic supporting parts 81 and 82 as illustrated in FIG. 21, to perform radial positioning of elastic supporting parts 81 and 82. Movable-range forming parts 54 have a circumferential length and a predetermined thickness, and positioning grooves 808 are formed correspondingly. In the present embodiment, movable-range forming parts 54 are fitted into positioning grooves 808, so as to position elastic supporting parts 81 and 82 while restricting the radial and circumferential movement of elastic supporting parts 81 and 82.

Position determination of elastic supporting parts 81 and 82 with respect to coil bobbin part 52 is made by protruding movable-range forming parts 54 fitted into positioning grooves 808, so that the positions of elastic supporting parts 81 and 82 are uniformly set in each individual drive unit 13, and the stable position determination of elastic supporting parts 81 and 82 with respect to coil bobbin part 52 can be performed. Thus, elastic supporting parts 81 and 82 are restricted from moving in the rotational direction, so that it is possible to reduce variations in elastic supporting parts 81 and 82 to achieve stable characteristics as a product.

Further, movable-range forming parts 54 are disposed at equal intervals around the axis of coil bobbin part 52. Movable-range forming parts 54 are disposed at three locations at equal intervals around the axis of coil bobbin part 52 in the present embodiment.

Further, three movable-range forming parts 54 bear each of elastic supporting parts 81 and 82, so that it is possible to prevent movable body 20 from being caught on coil bobbin part 52 and/or to reduce friction during insertion of movable body 20 into coil bobbin part 52, so as to easily perform the position determination of movable body 20 and coil bobbin part 52 with high assemblability.

Coil bobbin part 52 is housed in case 10 such that movable-range forming parts 54 at the upper and lower end portions are in contact with the edge of lid portion 12 and the edge of bottom portion 114, and is fixed to the edge of bottom portion 114.

Flange portions 527 and 528 include positioning engagement portions 529 that are engaged with electromagnetic shield part 58 to position electromagnetic shield part 58 in such a position as to surround coils 61 and 62 in the present embodiment.

Positioning engagement portions 529 are engaged with engaged portions 589 of electromagnetic shield part 58. Positioning engagement portions 529 are recessed grooves that open toward central flange portion 526 in the outer circumferential portions of respective flange portions 527 and 528, and are engaged with protruding engaged portions 589 in the present embodiment.

As described above, positioning engagement portions 529 for position determination of the electromagnetic shield part are disposed in the outer circumferential portions of flange portions 527 and 528, i.e., in the outer diameter portion of coil bobbin part 52. The engagement between positioning engagement portions 529 and engaged portions 589 makes it possible to dispose electromagnetic shield part 58 without any shift with respect to coils 61 and 62 wound around coil bobbin part 52, so as to achieve stable magnetic properties. Further, as opposed to a case where electromagnetic shield part 58 attached to coil bobbin part 52 while positioned only by the engagement of terminal bringing-out portion 90 and opening portion 582, it does not happen that a load is applied only on terminal bringing-out portion 90 to deform terminal lea-out portion 90.

As described above, it does not happen that a load applied to terminal bringing-out portion 90 deforms terminal tying parts 53 of terminal bringing-out portion 90, so that it is possible to prevent the deformation of terminal tying parts 53 so as to produce the vibration actuator steadily. Note that, an adhesion portion may be disposed on the outer circumferential surfaces of flange portions 526 to 528 having the same outer diameter, and electromagnetic shield part 58 may be adhered to flange portions 526 to 528 via the adhesion portion. It is thus possible to achieve stable vibration characteristics.

<Coil>

In vibration actuator 1, coils 61 and 62, together with magnet 30 and movable-body cores 41 and 42, are used for generating a drive source of vibration actuator 1, in which case the axial direction of coils 61 and 62 (magnetization direction of magnet 30) is the vibration direction. Coils 61 and 62 are energized during driving (vibration state), and, together with magnet 30, form a voice coil motor.

Coils 61 and 62 are disposed on coil attachment portions 52b and 52c, and coils 61 and 62 are disposed to face movable-body cores 41 and 42 in the direction orthogonal to the vibration direction.

Coils 61 and 62 are held by coil bobbin part 52 such that the center position of the length of the coils and the coil bobbin part in the coil-axis direction (vibration direction) is substantially the same position (including the same position) in the vibration direction as the center position of the length of movable body 20 in the vibration direction (the center position of magnet 30 in the vibration direction). Note that, coils 61 and 62 of the present embodiment are configured to be wound in directions opposite to each other, through which currents flow in the opposite directions during energization.

The end portions of coils 61 and 62 are tied and connected to terminal tying parts 53 of flange portion 526. Coils 61 and 62 are connected via terminal tying parts 53 to the power supplying section (e.g., drive control section 203 illustrated in FIGS. 35 and 36). For example, the end portions of coils 61 and 62 are connected via terminal tying parts 53 to an alternating-current supplying section, and coils 61 and 62 are supplied with alternating-power (AC) power (AC voltage) from the alternating-current supplying section. Thus, coils 61 and 62 can generate, between the magnet and coils 61 and 62, thrust allowing movement in a direction toward each other or away from each other in their axial direction.

In the present embodiment, connection of coils 61 and 62 is done by first tying one end portion of the coil winding to terminal tying part 53-1 as illustrated in FIGS. 8 and 16. The other-end-portion side of the winding whose one end portion is connected to terminal tying part 53-1 is guided by coil guide portion 92-1 (arrow D1) to a position where the first winding is formed in coil attachment portion 52c. At this first winding position, the winding is wound counterclockwise (arrow D2) to form the first winding, and counterclockwise windings (indicated by arrows D2 and D3) are repeatedly formed one after another. Accordingly, coil 62 is disposed on coil attachment portion 52c.

Then, the other-end-portion side of the winding of coil 62 is guided through linking groove portion 55 (indicated by arrow D4) to a first winding position in coil attachment portion 52b by coil guide portion 92-2 such that the winding direction is reversed in linking groove portion 55 (see arrow D5). The winding is wound on coil attachment portion 52b in the opposite direction to the winding direction in coil attachment portion 52c (here, the clockwise direction (indicated by arrows D6 and D7)). The windings are formed clockwise one after another, and coil 61 is disposed on coil attachment portion 52b. In the present embodiment, coils 61 and 62 are formed by a single winding, but the present invention is not limited thereto and may also be configured using coils 61 and 62 of separate bodies. In this configuration, when formed by windings wound in the same direction, the separate coils supply currents in directions different between the coils during driving.

It is preferable that the coil axes of coils 61 and 62 be disposed coaxially with the axis of coil bobbin part 52 or the axis of magnet 30.

Coils 61 and 62 are formed in a cylindrical shape by winding a coil wire on coil attachment portions 52b and 52c from the outside of coil bobbin part 52. With this configuration, coil bobbin part 52 including coils 61 and 62 maintains the cylindrical bodies of coils 61 and 62, and can thus be assembled without using a self-bonding wire for the coils. In other words, since it is not necessary to use an air-core coil as the coils, it is possible to reduce the cost of coils 61 and 62 itself and, thus, the cost of the entire vibration actuator.

Further, coils 61 and 62 are, at the outer circumferential surface, surrounded by electromagnetic shield part 58 inside case 10, sealed by coil attachment portion 52b and 52c, and fixed by adhesion or the like within coil attachment portions 52b and 52c. In the present embodiment, coils 61 and 62 are fixed by adhesion to all of bobbin main-body portion 522 and flange portions 526 to 528. It is thus possible to increase the bonding strength between coils 61 and 62 and coil bobbin part 52, so that even when a large impact is applied to coils 61 and 62, coils 61 and 62 are less damaged than in a configuration in which a movable body makes direct contact with a coil.

<Electromagnetic Shield Part 58>

Electromagnetic shield part 58 is a cylindrical magnetic material that surrounds the outer circumferential surface of coil bobbin part 52 and is disposed to cover coils 61 and 62 radially externally. Electromagnetic shield part 58, together with coils 61 and 62, constitutes a fixing-body-side magnetic circuit, and prevents, in the movable-body-side magnetic circuit, i.e., the magnetic circuit constituted by magnet 30 and movable-body cores 41 and 42, leakage magnetic flux to the outside of vibration actuator 1.

Electromagnetic shield part 58 is disposed such that the center of the length of electromagnetic shield part 58 in the vibration direction is located at the same height as the center in the vibration direction of magnet 30 disposed inside electromagnetic shield part 58. The shielding effect of electromagnetic shield part 58 makes it possible to reduce the leakage magnetic flux to the outside of the vibration actuator.

Electromagnetic shield part 58 also makes it possible to increase the thrust constant so as to increase the electromagnetic conversion efficiency in the magnetic circuit. Electromagnetic shield part 58 utilizes the magnetic attraction force of magnet 30 to function as a magnetic spring together with magnet 30. Any stress that would be caused if elastic supporting parts 81 and 82 are mechanical springs can be reduced, so that the durability of elastic supporting parts 81 and 82 can be increased.

Opening portion 582 through which terminal tying parts 53 are inserted is formed in electromagnetic shield part 58.

Figure 22:
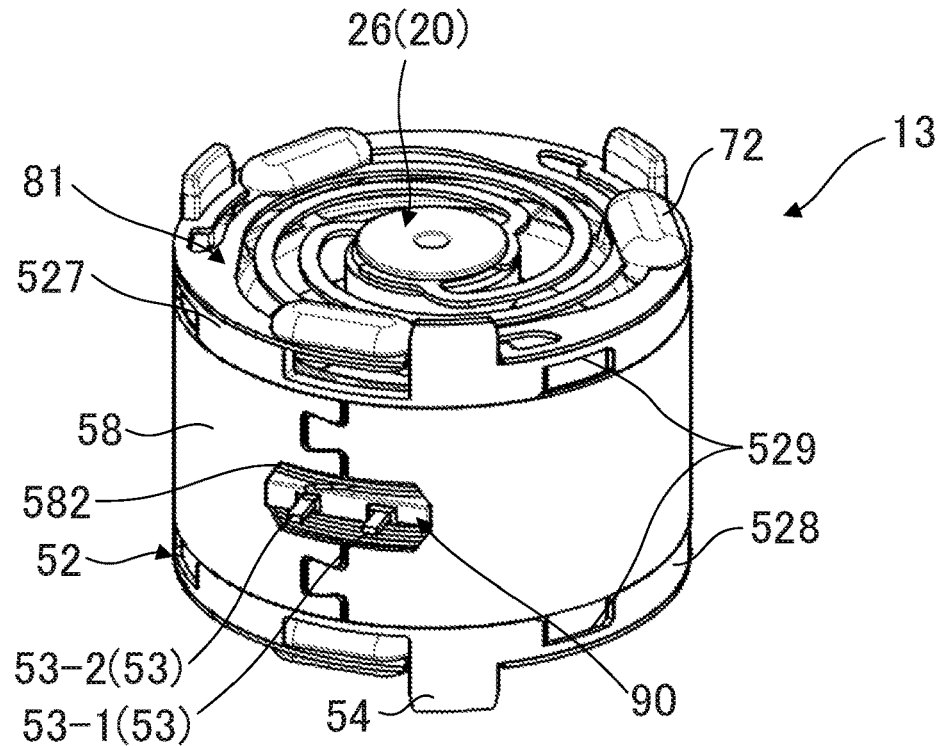
FIG. 22 is a perspective view of the coil assembly illustrated in FIG. 3 as seen from the side of the terminal tying parts.
Figure 23:
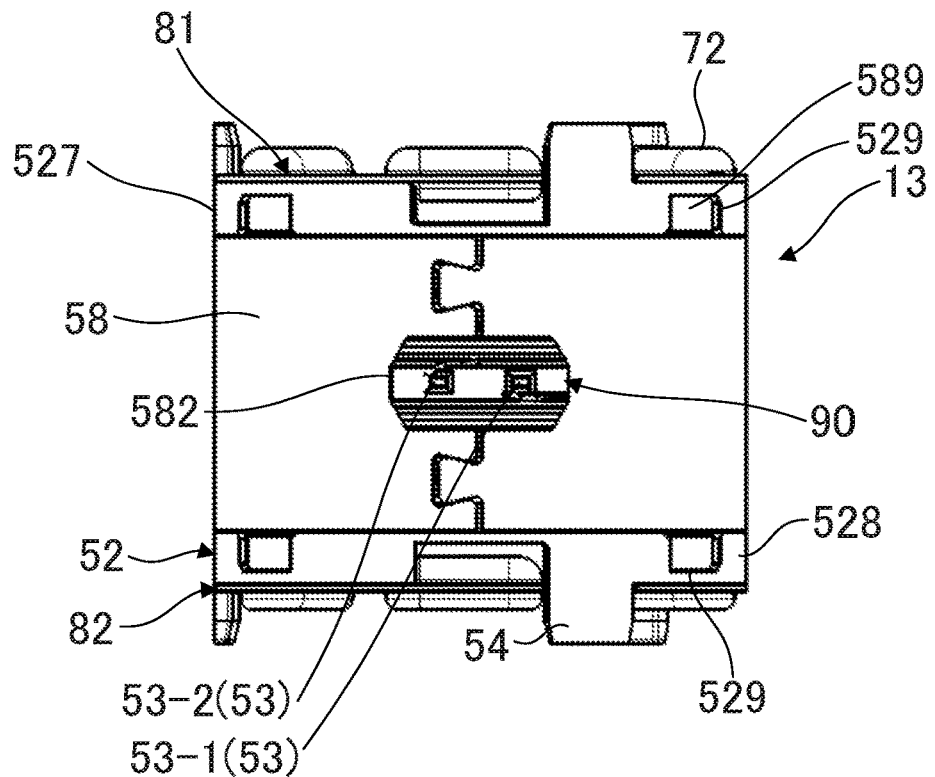
FIG. 23 is a side view of the coil assembly illustrated in FIG. 3 as seen from the side of the terminal tying parts.

Opening portion 582 is fitted to terminal bringing-out portion 90, and functions as a rotation stop against rotation of electromagnetic shield part 58 in the circumferential direction with respect to coil bobbin part 52 as illustrated in FIGS. 22 and 23.

Opening portion 582 is formed in the central portion of the main body of electromagnetic shield part 58 in a shape longer in the circumferential direction than in the upper-lower direction in the present embodiment. Electromagnetic shield part 58 extends above and below opening portion 582, so that electromagnetic shield part 58 is well balanced and makes it possible to reduce the imbalance of the magnetic attraction force and the leakage magnetic flux in the magnetic circuit to a minimum.

Note that, although this opening portion 582 is formed in the central portion of electromagnetic shield part 58 in the upper-lower direction (vibration direction) in the present embodiment, opening portion 582 may have any configuration as long as it allows terminal tying parts 53 of housed coil bobbin part 52 to protrude to the outside.

Figure 24:
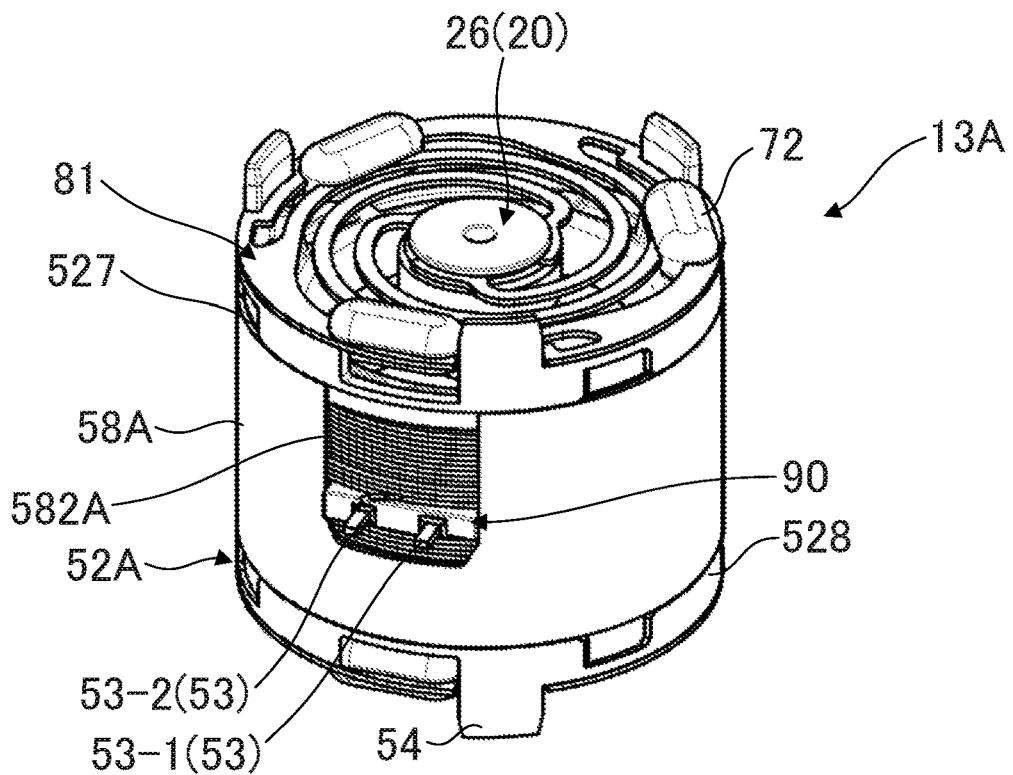
FIG. 24 is a perspective view illustrating a modification of the coil assembly.
Figure 25:
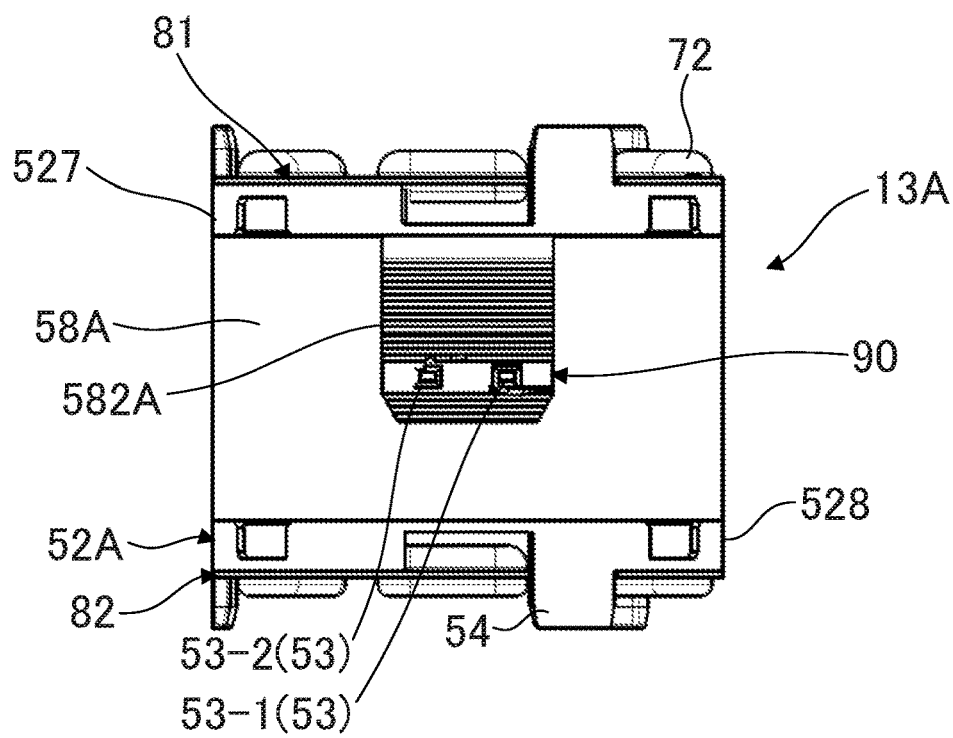
FIG. 25 is a side view illustrating the modification of the coil assembly.

For example, drive unit 13A illustrated in FIGS. 24 and 25 differs from drive unit 13 only in the configuration of electromagnetic shield part 58A.

Electromagnetic shield part 58A of drive unit 13A is provided with opening portion 582A having such a shape that a portion of cylindrical electromagnetic shield part 58A is cut out on one side of the opening portion.

That is, opening portion 582A of electromagnetic shield part 58A is formed in cylindrical electromagnetic shield part 58A to extend through electromagnetic shield part 58A and open at an opening edge portion on one side. Thus, when opening portion 582 is formed to open on one side in electromagnetic shield part 58A, electromagnetic shield part 58A can be fitted externally and attached to coil bobbin part 52A from one side of the opening portion in the axial direction. It is thus possible to easily attach electromagnetic shield part 58A to coil bobbin part 52A. In particular, it is possible to form an opening portion in electromagnetic shield part 58A, so as to improve the assemblability, even when the vibration actuator is miniaturized and/or thinned.

Further, engaged portions 589 to be engaged with positioning engagement portions 529 are formed to protrude from the opening edge portions of the openings that open in electromagnetic shield part 58 on the opposite sides in the axial direction.

Engaged portions 589 are disposed at positions corresponding to positioning engagement portions 529. Engaged portions 589 are engaged with positioning engagement portions 529, so that electromagnetic shield part 58 is restricted from moving with respect to coil bobbin part 52 in the circumferential direction and in the upper-lower direction, so as to be positioned to surround coils 61 and 62.

<Elastic Supporting Parts 81 and 82>

Elastic supporting parts 81 and 82 support movable body 20 such that the movable body freely reciprocates in the vibration direction with respect to fixing body 50.

Elastic supporting parts 81 and 82 sandwich movable body 20 in the vibration direction of movable body 20 and are installed between both movable body 20 and fixing body 50 to intersect the vibration direction. In the present embodiment, elastic supporting parts 81 and 82 are disposed respectively on the opposite ends (upper and lower ends) of movable body 20 which are distant from each other in the vibration direction, so as to be distant from each other, and are connected to fixing body 50 as illustrated in FIGS. 2 to 4. In the present embodiment, elastic supporting parts 81 and 82 are disposed to extend in the direction orthogonal to the vibration direction and to face each other.

In elastic supporting parts 81 and 82, their inner circumferential portions 802 are fitted respectively to the opposite end portions (spring fixation portions 224 and 244) of movable body 20 spaced apart from each other in the axial direction (vibration direction) of the movable body. Elastic supporting parts 81 and 82 are attached to movable body 20 such that outer circumferential fixing portions 806 project radially outward (in the radial direction).

Elastic supporting parts 81 and 82 support movable body 20 such that movable body 20 does not make contact with fixing body 50 in the non-vibration state and the vibration state of movable body 20. Note that, elastic supporting parts 81 and 82 do not allow the magnetic circuit (specifically, coils 61 and 62) to be damaged even when movable body 20 makes contact with inner circumferential surface 522a of bobbin main-body portion 522 in the driven (vibration) state of movable body 20. Elastic supporting parts 81 and 82 may also be formed from any material as long as they elastically support movable body 20 such that the movable body is freely movable. Elastic supporting parts 81 and 82 are the same members having the same configuration in the present embodiment.

Elastic supporting parts 81 and 82 are a plurality of flat plate-like leaf springs. For movable body 20, the plurality of elastic supporting parts 81 and 82 may be three or more leaf springs. The plurality of leaf springs are attached to extend along the direction orthogonal to the vibration direction.

Each of elastic supporting parts 81 and 82 that are leaf springs has such a shape that annular inner circumferential portion 802, which is a spring end portion situated on the inner side, and outer circumferential fixing portion 806, which is a spring end portion situated on the outer side, are joined to each other via deformation arms 804 that are elastically deformed and have the shape of circular arcs in plan view. Deformation arms 804 and outer circumferential fixing portion 806 constitute outer circumferential portion 807 of each of elastic supporting parts 81 and 82. Deformation of deformation arm 804 causes inner circumferential portion 802 and outer circumferential fixing portion 806 to be relatively displaced in the axial direction.

In elastic supporting parts 81 and 82, outer circumferential fixing portion 806 is joined to fixing body 50, and inner circumferential portion 802 is joined to movable body 20.

The leaf springs as elastic supporting parts 81 and 82 are formed by sheet metal processing using a stainless steel plate, and more specifically, are formed into thin flat disk-shaped whirl-shaped springs in the present embodiment. Since elastic supporting parts 81 and 82 are flat plate-like, it is possible to improve the positional accuracy, that is, to improve the processing accuracy as compared with a conical spring.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 in the present embodiment such that the directions of the whirls of elastic supporting parts 81 and 82 are the same.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the vibration direction, and elastically support movable body 20 with respect to fixing body 50. Thus, when the movement amount of movable body 20 increases, the movable body slightly moves in a translational direction (here, the direction on a plane perpendicular to the vibration direction) while rotating. If the whirl directions of the plurality of leaf springs are opposite, the plurality of leaf springs move in a buckling direction or a pulling direction to each other, thereby preventing smooth movement.

Elastic supporting parts 81 and 82 of the present embodiment are fixed to movable body 20 such that the whirl directions are the same. Thus, even when the movement amount of movable body 20 increases, elastic supporting parts 81 and 82 can move smoothly, i.e., can be deformed to produce a greater amplitude, so that the vibration output can be increased.

However, depending on a desired vibration range of movable body 20, the whirl directions of the plurality of elastic supporting parts 81 and 82 may be designed to be opposite directions to each other.

Plate-like elastic supporting parts 81 and 82 are disposed on movable body 20 such that inner circumferential portions 802 of elastic supporting parts 81 and 82 are stacked respectively on spring fixation portions 224 and 244 forming the end portions of movable body 20 in the vibration direction. Inner circumferential portions 802 of elastic supporting parts 81 and 82 are fixedly sandwiched between flanges 264 and 284 of fixation pins 26 and 28 and spring fixation portions 224 and 244 as described above.

Meanwhile, outer circumferential fixing portion 806 of upper elastic supporting part 81 is, at the outside in the radial direction, fixed to the upper end portion of coil bobbin part 52. Specifically, outer circumference fixing portion 806 of elastic supporting part 81 is fixed to a portion of annular upper end surface 527a of upper flange portion 527 forming the upper end portion of coil bobbin part 52, the portion being other than movable-range forming parts 54.

Outer circumferential fixing portion 806 of elastic supporting part 81 is clamped and fixed by annular upper end surface 527a of flange portion 527 and pressing portion 128 of lid portion 12 within case 10. Note that, upper end surface 527a is an upper (one-side) end surface of the portion of the upper side (one side) of upper (one-side) flange portion 527 other than movable-range forming parts 54.

Further, outer circumferential fixing portion 806 of lower elastic supporting part 82 is, at the outside in the radial direction, fixed to the lower end portion of coil bobbin part 52. Specifically, outer circumference fixing portion 806 of elastic supporting part 82 is fixed to a portion of annular lower end surface 528a of lower flange portion 528 forming the lower end portion of coil bobbin part 52, the portion being other than movable-range forming parts 54.

Outer circumferential fixing portion 806 of elastic supporting part 82 is clamped and fixed by annular lower end surface 528a of flange portion 528 and step portion 118 formed on a circumferential edge portion of bottom portion 114 within case 10.

As described above, elastic supporting parts 81 and 82 are clamped between opening end surfaces 527a and 528a of the upper and lower opening edge portions of coil bobbin part 52, on the one hand, and lid portion 12 and bottom portion 114 of case 10, on the other hand, so as to be disposed to extend in the direction orthogonal to the vibration direction. Further, movable body 20 is housed in coil bobbin part 52 around which coils 61 and 62 are wound, inner circumferential portions 802 of elastic supporting parts 81 and 82 are fixed to the upper and lower end portions of movable body 20, and outer circumferential fixing portions 806 of elastic supporting parts 81 and 82 are fixed to the upper end portion of coil bobbin part 52. Drive unit 13 in which the positional relationship between coils 61 and 62 and movable body 20 is defined is configured as described above, so that it becomes easier to disposed it in case 10.

Elastic supporting parts 81 and 82 include damping parts (dampers) 72 as a damping means for damping the vibration generated in elastic supporting part 81, which are attached to deformation arms 804 or to deformation arms 804 and outer circumferential fixing portions 806 in the present embodiment. The damping means reduces a resonant peak and generates a wide range of stable vibrations in elastic support 81.

Each of damping parts 72 of the present embodiment is, for example, elastomer and is sectionally T-shaped as illustrated in FIGS. 6 and 7, and includes plate-like flange 722 and pushing portion 724 formed to protrude from the central portion of flange 722.

Damping part 72 is disposed such that pushing portion 724 is inserted between spring portions (specifically, between outer circumferential fixing portion 806 and deformation arms 804) from one surface side of elastic supporting part 81 (82) and flange 722 is situated in an archlike manner between the spring portions. Attachment parts 73 are a thermosetting resin or an adhesive or the like which is not adhered to elastic supporting part 81 (82), and are fixed to pushing portions 724 on the back surface side of elastic supporting part 81 (82) while formed into such a shape that pushing portions 724 do not come off gaps between the spring portions. Note that, in FIGS. 2, 12 to 14, 20, and 34, damping parts 72 are illustrated as single members fixed in a state where elastic supporting part 81 (82) is clamped from both sides via pushing portions 724. Damping parts 72 do not have to be an elastomer, and may also be formed from a thermosetting resin, an adhesive, or the like as long as they are formed from a material having a damping function. Damping parts 72 may have any configuration as long as they are shaped to clamp elastic supporting part 81 (82) from the both sides by a plate-like flange and a separate member joined with a pushing portion to a member having the same function as this flange.

With this configuration, damping parts 72 damp a sharp spring resonance in elastic supporting part 81 (82), so as to prevent a significant increase in vibrations at frequencies close to the resonance frequency and, thus, to prevent a greater difference in vibration from being caused between frequencies. Thus, in movable body 20, a resonance peak is reduced before plastic deformation, and stable vibrations can be produced over a wide range without contact between the movable body and lid portion 12 and bottom portion 114, so that no abnormal noise is caused due to contact. Damping parts 72 may be formed into any shape or from any material as long as they prevent the occurrence of sharp vibrations in elastic supporting part 81 (82).

<Case 10>

Figure 10:
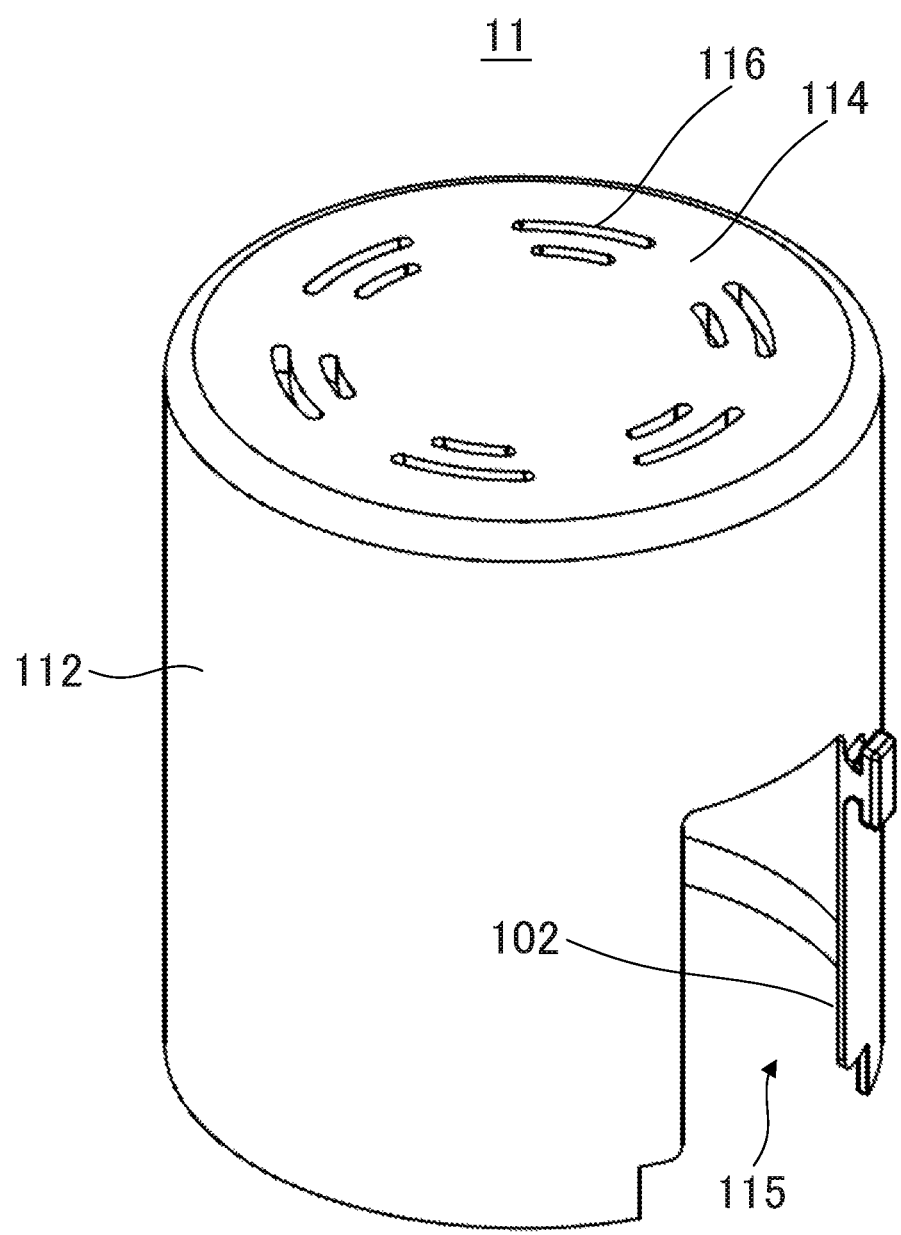
FIG. 10 is a bottom-surface-side perspective view of a case main body.
Figure 11:
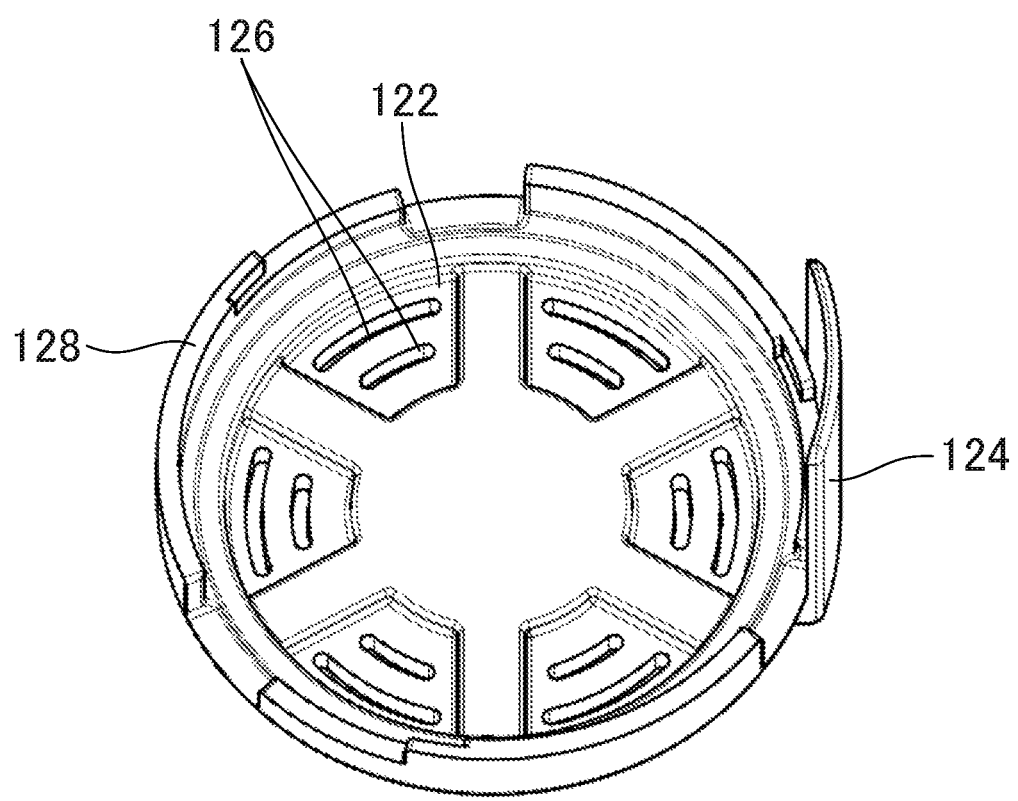
FIG. 11 illustrates a lid portion as seen from the back surface side.

FIG. 10 is a bottom-surface-side perspective view of the case main body, and FIG. 11 illustrates the lid portion as seen from the back surface side. Case 10 includes: bottomed cylindrical case main body 11 having circumferential wall portion 112 and bottom portion 114; and lid portion 12 for closing opening portion 115 of case main body 11 as illustrated in FIGS. 1, 3, 10 and 11.

Lid portion 12 and bottom portion 114 respectively form top surface portion 122 and lower surface portion (bottom portion 114) of vibration actuator 1 in the present embodiment, and are disposed to face movable body 20 of drive unit 13 with a predetermined gap being interposed between the lid portion and the bottom portion, on the one hand, and the movable body, on the other hand, in the vibration direction of movable body 20. Lid portion 12 includes hanging portion 124 that hangs from a portion of the outer circumference of top surface portion 122 and is engaged with cutout space 102 in case main body 11.

Lid portion 12 and bottom portion 114 reduce the movable range of movable body 20. Lid portion 12 and bottom portion 114 function as a movable-range reducing part that serves as a hard stop (movable range limitation) of movable body 20.

Specifically, lid portion 12 and bottom portion 114 restrict the movable range formed by movable-range forming part 54. That is, lid portion 12 and bottom portion 114 restrict the lengths from lid portion 12 and bottom portion 114 to the edges of the upper and lower end portions of drive unit 13 (coil bobbin part 52) (to opening end surfaces 527*a* and 528*a* of upper and lower flange portions 527 and 528). Thus, the hollow in case 10 forms a movable-body space, which is a space in which movable body 20 moves.

Thus, the movable-body space is defined as the length of the range in which elastic supporting parts 81 and 82 do not plastically deform. Thus, even when a force causing movable body 20 to move beyond the movable range is applied on movable body 20, elastic supporting parts 81 and 82 make contact with fixing body 50 (at least one of lid portion 12 and bottom portion 114) without being plastically deformed, so that elastic supporting parts 81 and 82 are not damaged, and reliability can be increased.

Further, vent holes 126 and 116 are formed to extend through lid portion 12 and bottom portion 114, respectively. Vent holes 126 and 116 release, to the outside, compressed air formed in case 10 by the reciprocating vibration of movable body 20.

Figure 26:
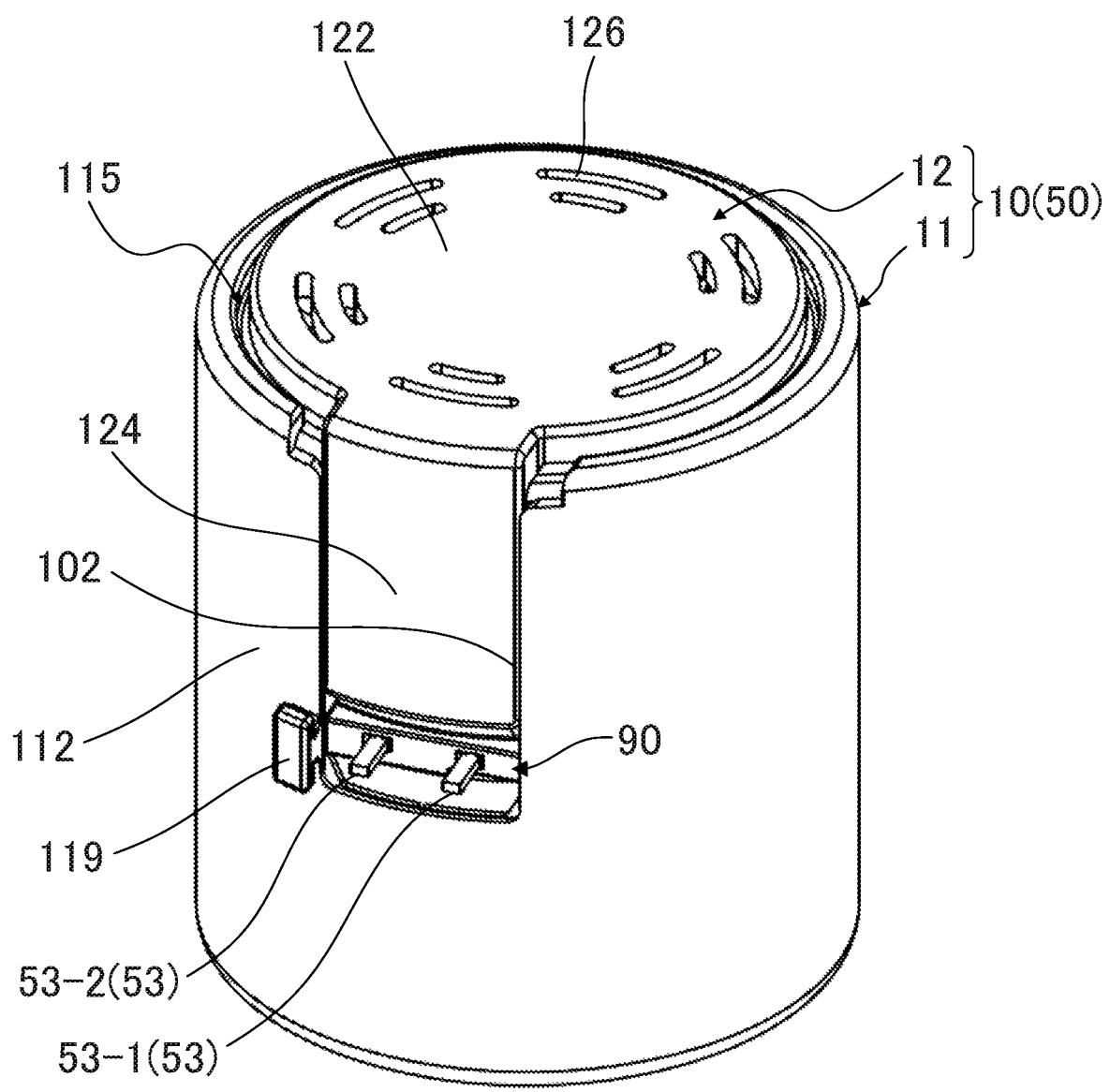
FIG. 26 is an external perspective view of the vibration actuator according to an embodiment of the present invention as seen from the side of a cutout space.
Figure 27:
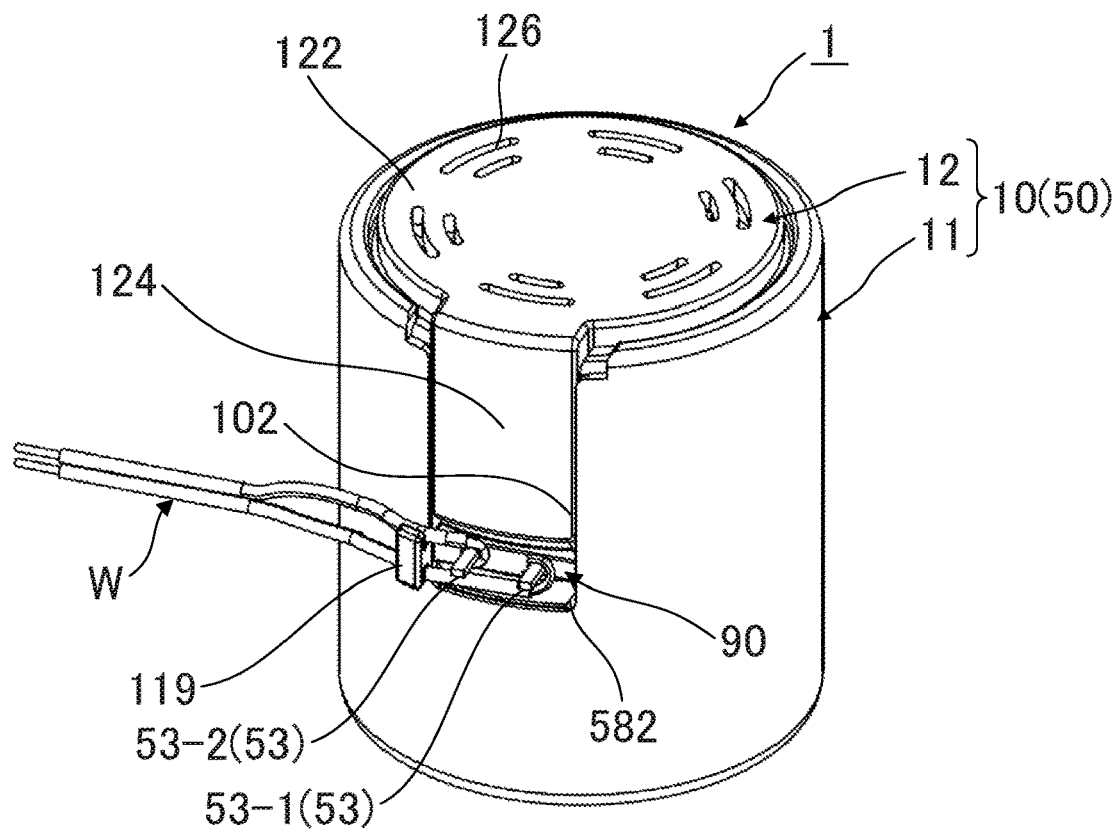
FIG. 27 is an external perspective view of the vibration actuator in a state where a cable is connected to the terminal tying parts.
Figure 28:
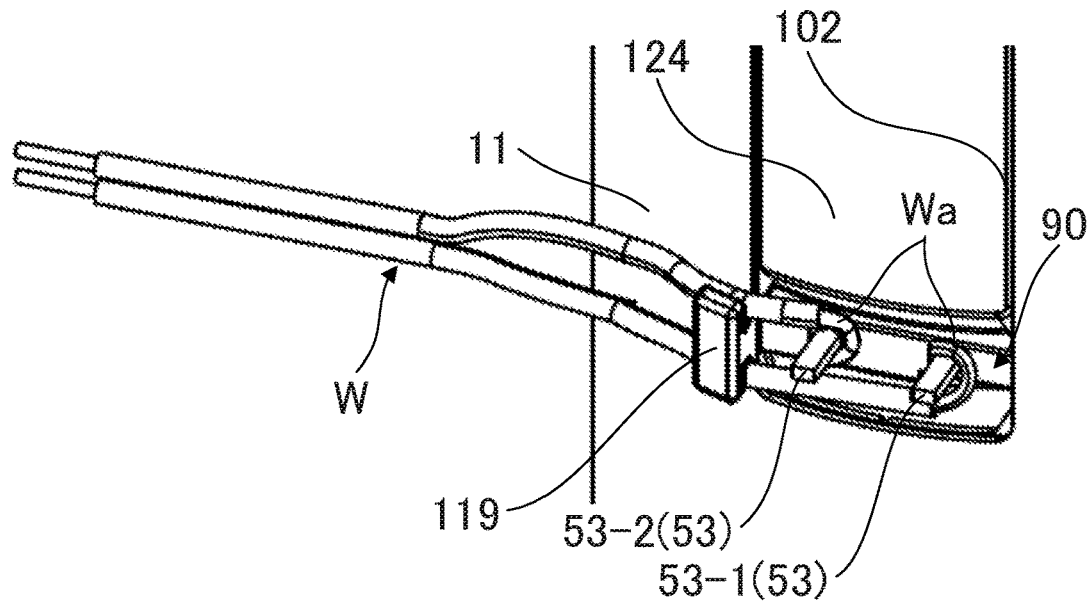
FIG. 28 is an enlarged view of a connection portion between the terminal tying parts and the cable illustrated in FIG. 27.

FIG. 26 is an external perspective view of vibration actuator 1 according to an embodiment of the present invention as seen from the side of the cutout space. Further, FIG. 27 is an external perspective view of the vibration actuator in a state where cable W is connected to terminal tying parts 53, and FIG. 28 is an enlarged view of a connection portion between terminal tying parts 53 and cable W illustrated in FIG. 27.

As illustrated in FIG. 26, terminal bringing-out portion 90 of coil bobbin part 52 and hanging portion 124 are disposed in cutout space 102 in case 10, and cutout space 102 in case 10 is closed by these terminal bringing-out portion 90 and hanging portion 124.

Thus, terminal tying parts 53 are disposed to protrude outward from cutout space 102 of case 10, and connection to an external device is facilitated via terminal tying parts 53.

Further, protruding portion 119 for wire fixation is disposed on the outer circumferential surface of case 10. Protruding portion 119 for wire fixation is formed to be engageable with cable W connected to terminal tying parts 53, and is engaged with cable W to hold it as illustrated in FIGS. 27 and 28. Thus, end portions Wa of cable W fixed by protruding portion 119 can be conductively connected to terminal tying parts 53 with high accuracy.

It is preferable that protruding portion 119 be formed in the vicinity of opening portion 582 to which terminal bringing-out portion 90 is fitted. Thus, cable W can be held in the vicinity of terminal tying parts 53, so that it is possible to easily perform the work for connecting cable W to terminal tying parts 53.

Figure 29:
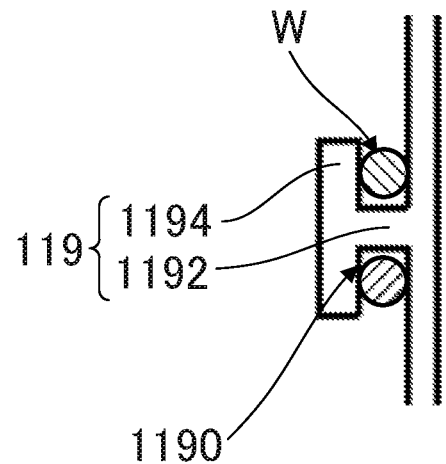
FIG. 29 is a sectional view of a case protruding portion.

Protruding portion 119 includes protruding piece 1192 protruding from the outer circumferential surface of case 10, and orthogonal piece 1194 protruding from the tip of protruding piece 1192 in a direction intersecting protruding piece 1192 (here, vertically protruding) as illustrated in FIG. 29. Protruding piece 1192 and orthogonal piece 1194, together with the outer circumferential surface, form grooves 1190 through which a wire is passable, and cable W is internally fitted into and engaged with this grooves 1190, so as to be fixed thereto.

In the present embodiment, orthogonal piece 1194 is connected to the tip of protruding piece 1192, so that protruding portion 119 is formed into a T-shape in sectional view. Thus, protruding portion 119 includes two grooves 1190 between which protruding piece 1192 is present. Thus, the two wires of cable W can be internally fitted into and engaged with grooves 1190, respectively, so that it is possible to easily stabilize the process and hold the wires themselves.

Figure 30:
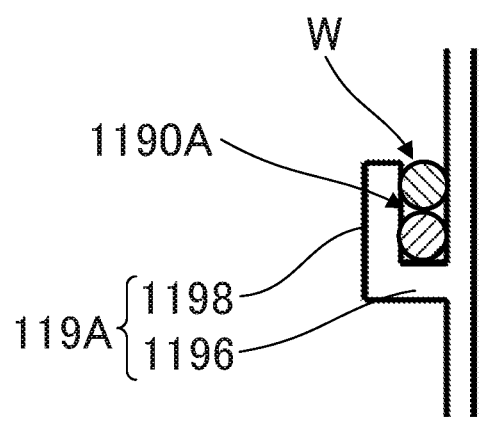
FIG. 30 is a sectional view illustrating a modification of the case protruding portion.

Note that, protruding portion 119 only has to hold cable W such that end portions Wa of cable W are conductively connected to terminal tying parts 53 with high accuracy. For example, protruding portion 119A for wire fixation illustrated in FIG. 30 may have a configuration in which orthogonal piece 1198 forming a L-shape in sectional view together with protruding piece 1196 is joined to the tip of protruding piece 1196 protruding from the outer circumferential surface of case 10 such that orthogonal piece 1198 is orthogonal to protruding piece 1196.

In protruding portion 119A, groove 1190A is formed by protruding piece 1196, the outer circumferential surface, and orthogonal piece 1198. Protruding portion 119A can hold two wires of cable W together by this groove 1190A, and can obtain the same effect as T-shaped protruding portion 119.

It is preferable that end portions Wa of cable W be formed to be easily connectable to terminal tying parts 53.

Figure 31:
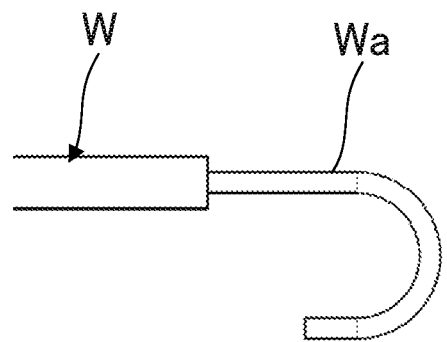
FIG. 31 illustrates a cable end portion.

FIG. 31 illustrates one of end portions Wa of cable W.

Figure 32:
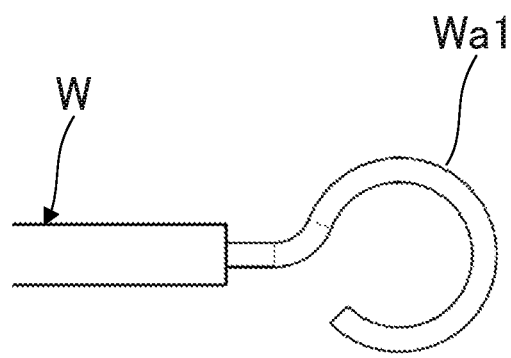
FIG. 32 illustrates a modification of the cable end portion.

In the present embodiment, each of end portions Wa of cable W has such a shape as to be capable of being easily engaged with pin-shaped terminal tying parts 53, and is formed in a U-shape. Further, end portion Wa1 of cable W may also be formed in the shape of a partially cut out ring as illustrated in FIG. 32.

End portion Wa having such a shape can be hooked and held by terminal tying parts 53, so that end portion Wa can be soldered while being hooked, that is, while being positioned. It is thus possible to securely fix end portions Wa to terminal tying parts 53 in a stable conductive state, so as to easily perform a conduction process.

<Operation of Vibration Actuator 1>

A description will be given of operation of vibration actuator 1 in relation to one example in which magnet 30 is magnetized such that the side of front surface 30*a*, which is one side of magnet 30 in the magnetization direction (upper side in the present embodiment), is the N-pole, and the side of back surface 30*b*, which is the other side in the magnetization direction (lower side in the present embodiment), is the S-pole.

In vibration actuator 1, movable body 20 is considered to correspond to a mass in a vibration model of a spring-mass system, and a sharp peak is reduced by damping a vibration when a resonance is sharp (has a sharp peak). Damping the vibration makes the resonance less sharp, so that the maximum amplitude value and the maximum movement amount of movable body 20 at the time of resonance do not vary, and vibrations of the suitable and stable maximum movement amount are output.

Figure 12:
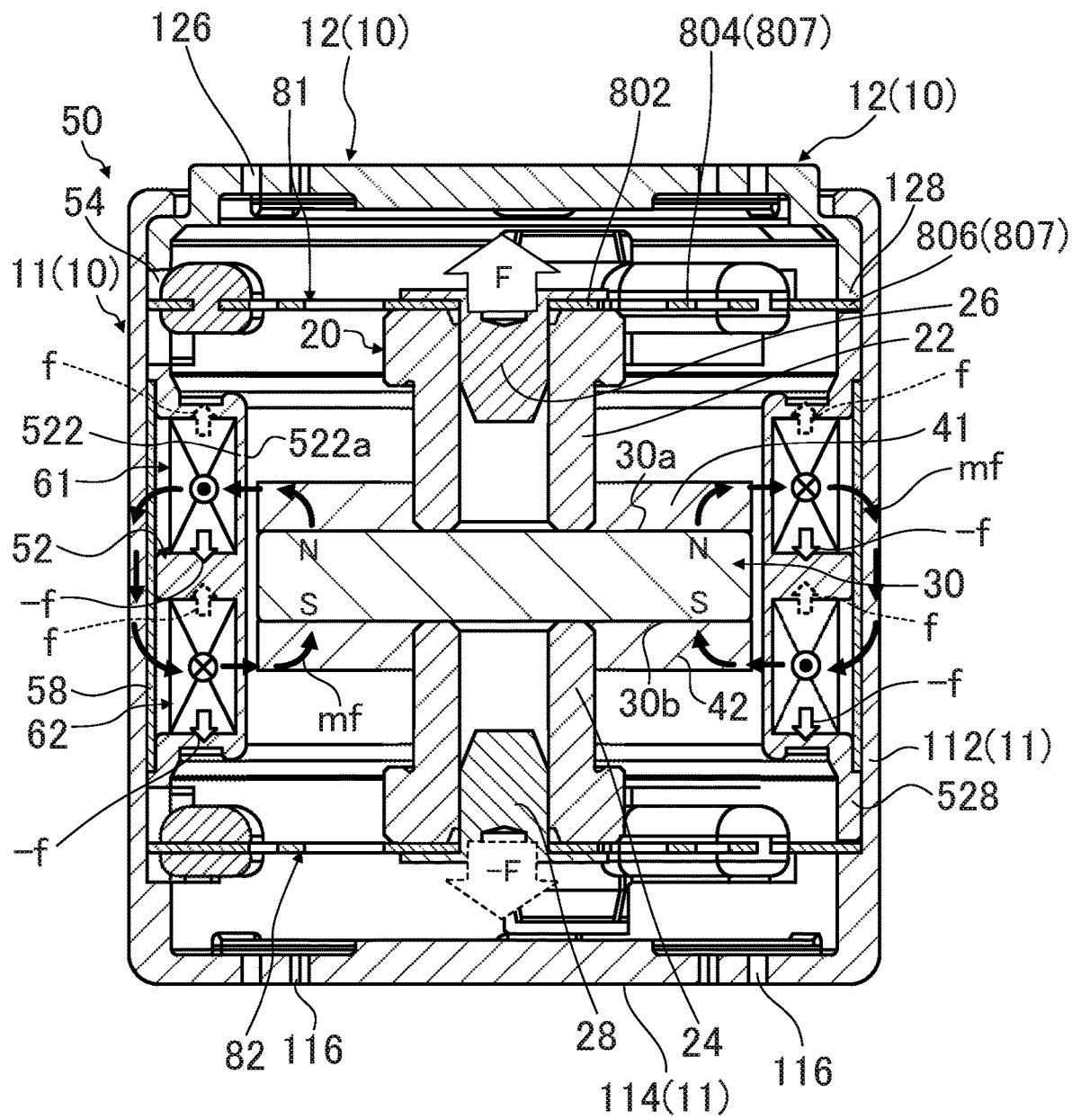
FIG. 12 schematically illustrates a magnetic circuit configuration of the vibration actuator.
Figure 13:
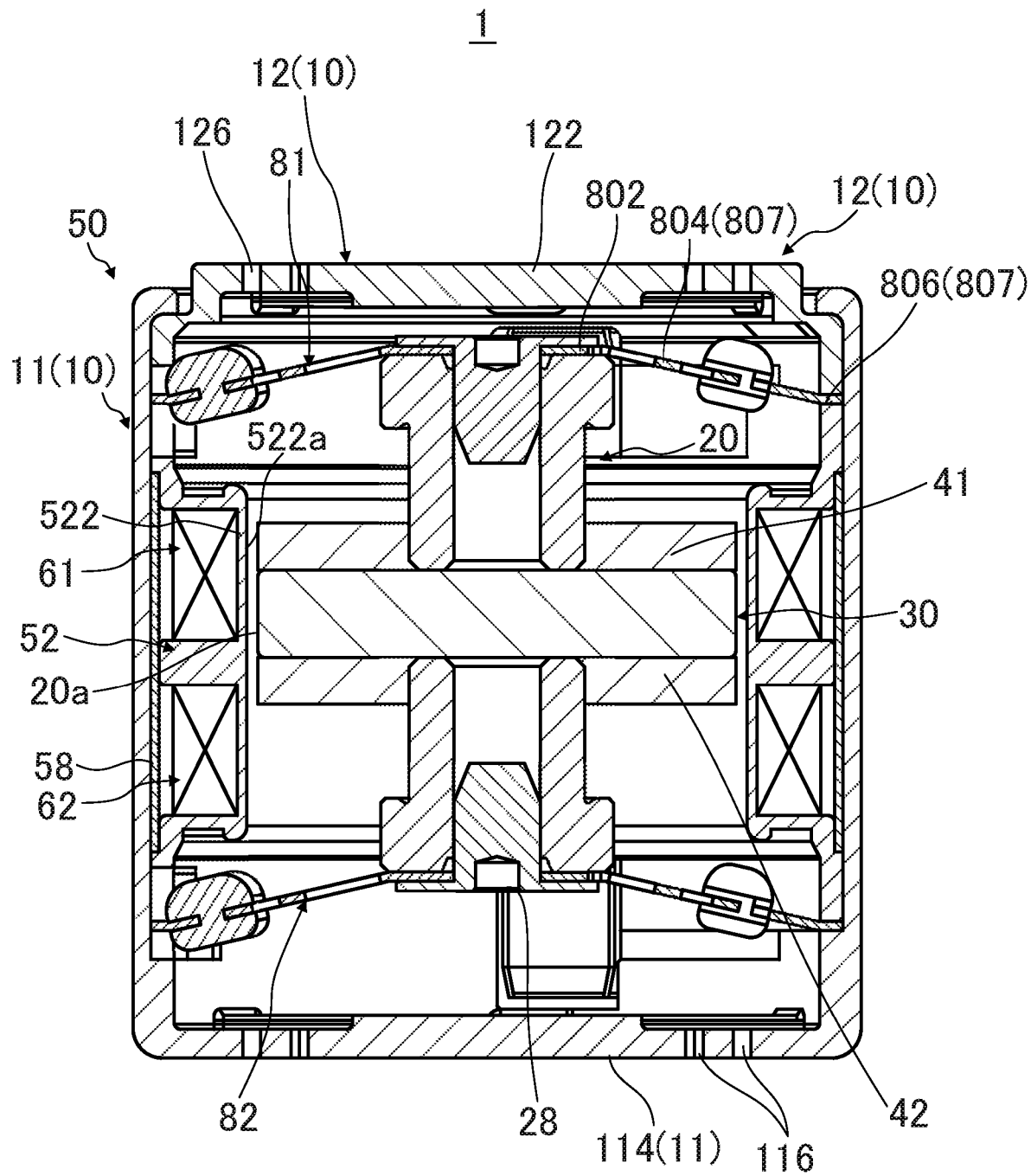
FIG. 13 illustrates a state of relative movement between a coil and a magnet.
Figure 14:
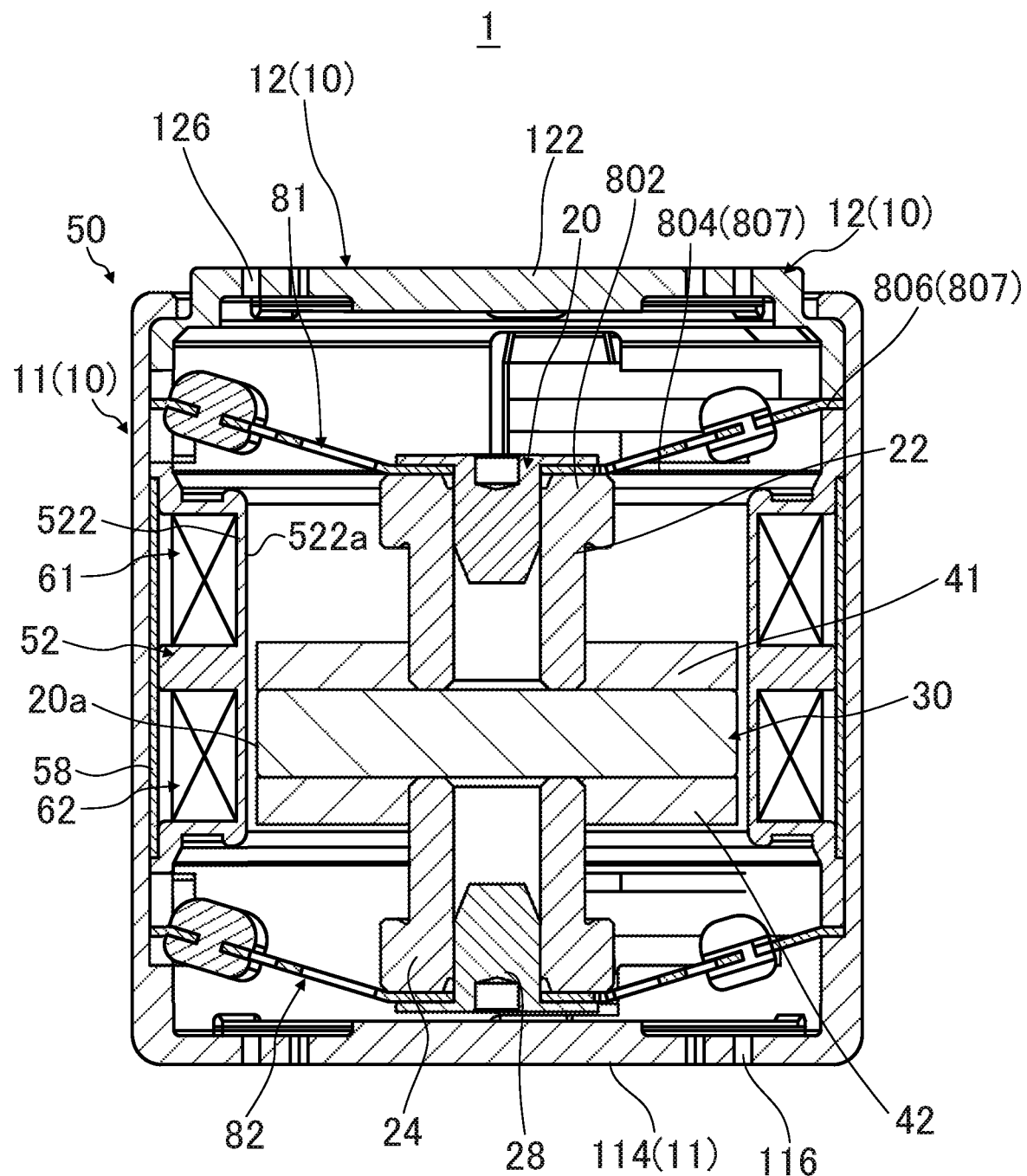
FIG. 14 illustrates a state of relative movement between the coil and the magnet.
Figure 15:
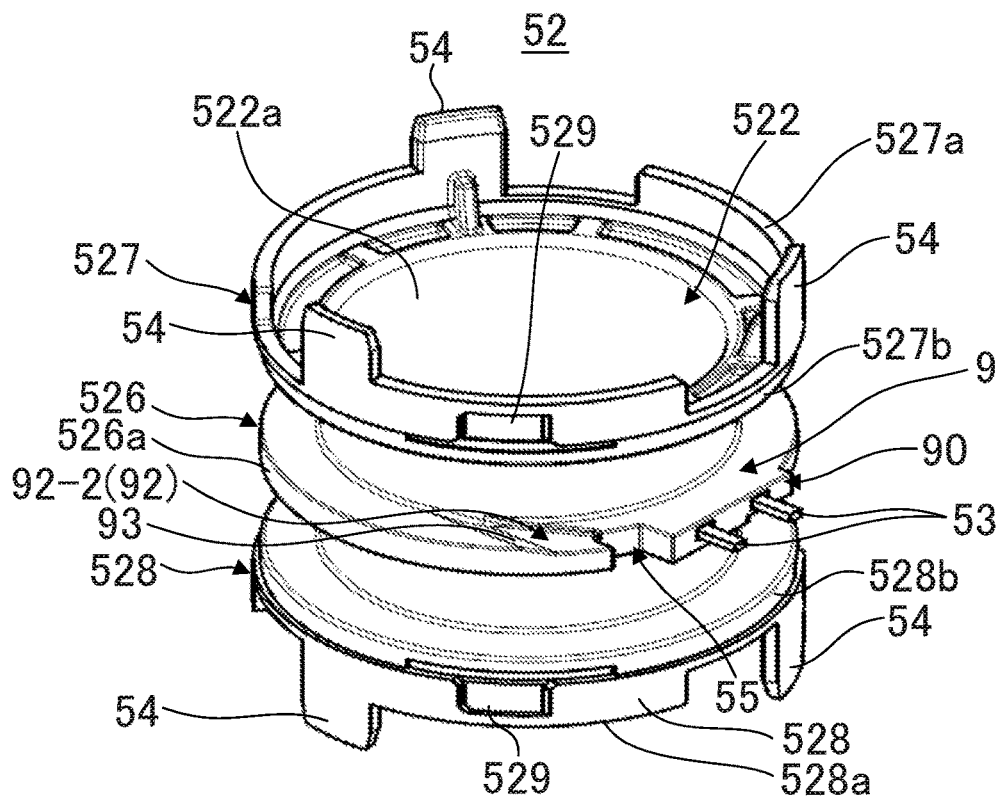
FIG. 15 is a perspective view of a coil bobbin part including terminal tying parts.

The magnetic circuit illustrated in FIG. 12 is formed in vibration actuator 1. Further, in vibration actuator 1, coils 61 and 62 are disposed such that the coil axes are orthogonal to the magnetic flux of movable-body cores 41 and 42 and the like sandwiching magnet 30 in the vibration direction.

Specifically, flow mf of the magnetic flux is formed which is emitted from the side of surface 30a of magnet 30, emitted from movable-body core 41 to the side of coil 61, passes through electromagnetic shield part 58, and enters magnet 30 via coil 62 from lower movable-body core 42 of magnet 30.

Accordingly, when energization is performed as illustrated in FIG. 12, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62. Since coils 61 and 62 are fixed to fixing body 50 (coil bobbin part 52), the opposite force to this Lorentz force in the −f direction is generated in movable body 20 including magnet 30 as thrust in the F direction in accordance with the law of action and reaction. Thus, the side of movable body 20 including magnet 30 moves in the F direction, i.e., toward lid portion 12 (top surface portion 122 of lid portion 12) (see FIG. 13).

Further, when the energization direction of coils 61 and 62 is switched in the opposite direction and coils 61 and 62 are energized, the Lorentz force in the F direction reverse to the −f direction is generated. The generation of Lorentz force in this F direction causes in movable body 20 the force opposite to the Lorentz force in the F direction as thrust (thrust in the −F direction) in accordance with the law of action and reaction, so that movable body 20 moves in the −F direction, i.e., toward bottom portion 114 of fixing body 50 (see FIG. 14).

In vibration actuator 1, a magnetic attraction force acts between magnet 30 and electromagnetic shield part 58, which functions as a magnetic spring in a non-driven (non-vibration) state in which vibration actuator 1 is not energized. The magnetic attraction force generated between magnet 30 and electromagnetic shield part 58 and a restoring force that brings elastic supporting parts 81 and 82 back to their original shapes cause movable body 20 to return to its original position.

Vibration actuator 1 includes: fixing body 50 including coils 61 and 62; and movable body 20 disposed radially inside coils 61 and 62 and including magnet 30 magnetized in the axial direction of coils 61 and 62. In addition, vibration actuator 1 includes flat plate-like elastic supporting parts 81 and 82 that elastically hold movable body 20 such that movable body 20 is freely movable in the vibration direction that is the coil-axis direction.

Further, coils 61 and 62 are disposed on the outer circumference of bobbin main-body portion 522 of coil bobbin part 52, outer circumferential surface 20a of movable body 20 is disposed on the inner circumferential side of bobbin main-body portion 522 with a gap being interposed between the outer circumferential surface of the movable body and the bobbin main-body portion, and coils 61 and 62 are, at the outer circumferential surface, surrounded by electromagnetic shield part 58.

Elastic supporting parts 81 and 82 support movable body 20 such that there is a predetermined gap between movable body 20 and inner circumferential surface 522a of bobbin main-body portion 522 in order that movable body 20 does not make contact with inner circumferential surface 522a in the non-vibration state and the vibration state of movable body 20.

Further, coils 61 and 62 are disposed on the outer circumference of bobbin main-body portion 522, i.e., coils 61 and 62 are wound around the outer circumference of bobbin main-body portion 522, so that it is possible to reduce the cost as compared with the case of using an air-core coil. Furthermore, vibration actuator 1 has a structure in which drive unit 13 is housed in case 10, so that the outer circumferential surface of circumferential wall portion 112 of case 10 can be formed as a smooth surface. Thus, when vibration actuator 1 is attached to an electronic device, it is possible to reliably and easily perform attachment of a cushioning material such as a sponge to be interposed between vibration actuator 1 and a mounting point.

Coils 61 and 62 are disposed on the outer circumferential side of coil bobbin part 52 that is a coil holding part disposed in case 10. Thus, it is not necessary to perform work of taking out the end of a coil wire to the outside, which is required for connection of the coil wire to an external device during assembly in a configuration in which coils 61 and 62 are disposed on the inner circumferential side of the coil holding part.

Moreover, vibration actuator 1 has the configuration in which drive unit 13 is disposed in case 10, so that fixation of elastic supporting parts 81 and 82, which requires high dimensional accuracy, can be achieved by attaching elastic supporting parts 81 and 82 to coil bobbin part 52. Thus, arrangement of movable body 20 including the fixation of elastic supporting parts 81 and 82 can be determined with reference to coil bobbin part 52, so that it is possible to increase the accuracy of the vibration generation direction of the product. Specifically, only increasing the dimensional accuracy of coil bobbin part 52 formed as one component from a resin or the like makes it possible to easily dispose coils 61 and 62 and movable body 20 (magnet 30) attached via elastic supporting parts 81 and 82 in an accurate positional relationship, for example.

Further, electromagnetic shield part 58 is attached to coil bobbin part 52 disposed in case 10, so as to surround coils 61 and 62, so that the outer circumferential surface of circumferential wall portion 112 of case 10 form a smooth surface of a resin with good surface accuracy. Thus, a preferable bonding state of a member for attachment of the cushioning material (for example, a double-sided tape) is achieved, and the bonding strength can be increased.

Further, terminal tying parts 53 are disposed in coil bobbin part 52 to protrude outward, so that tying and soldering of the coil wire of the coils are facilitated, and connection between an external device and coils 61 and 62 can be facilitated.

In addition, case 10 is formed by bottomed cylindrical case main body 11 (that is, cup-shaped case main body 11) and lid portion 12. Thus, the number of parts is less than in a configuration in which circumferential wall portion 112 and bottom portion 114 are separate from each other, and it is possible to improve the assemblability and the impact resistance.

Figure 34A:
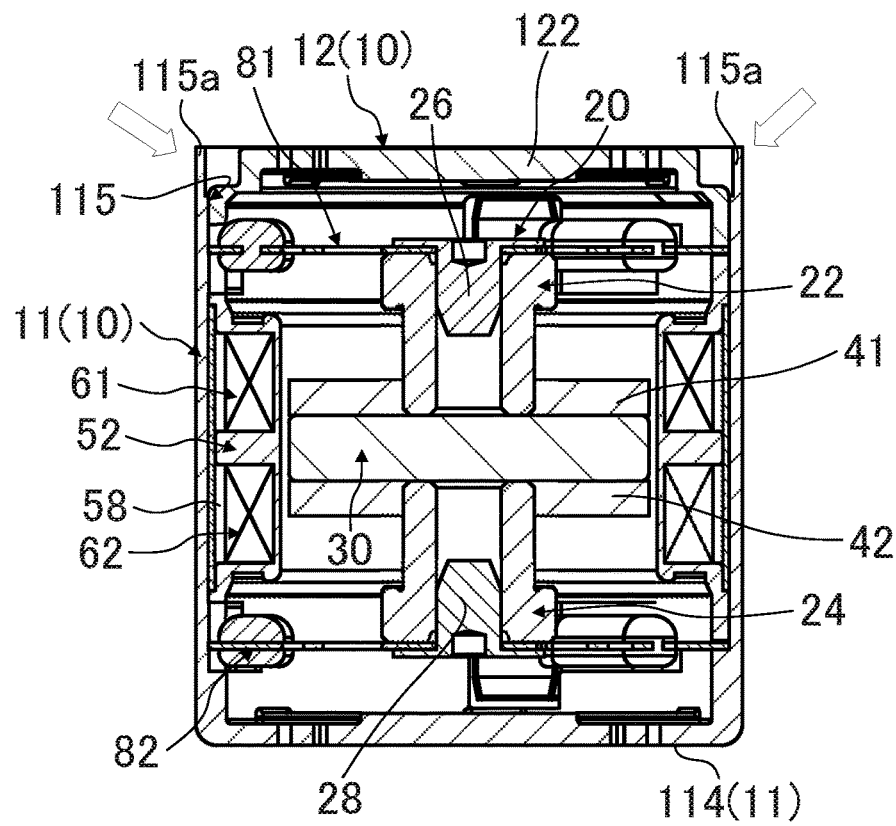
FIGS. 34A and 34B are longitudinal sectional views illustrating an assembly process of the vibration actuator.
Figure 34B:
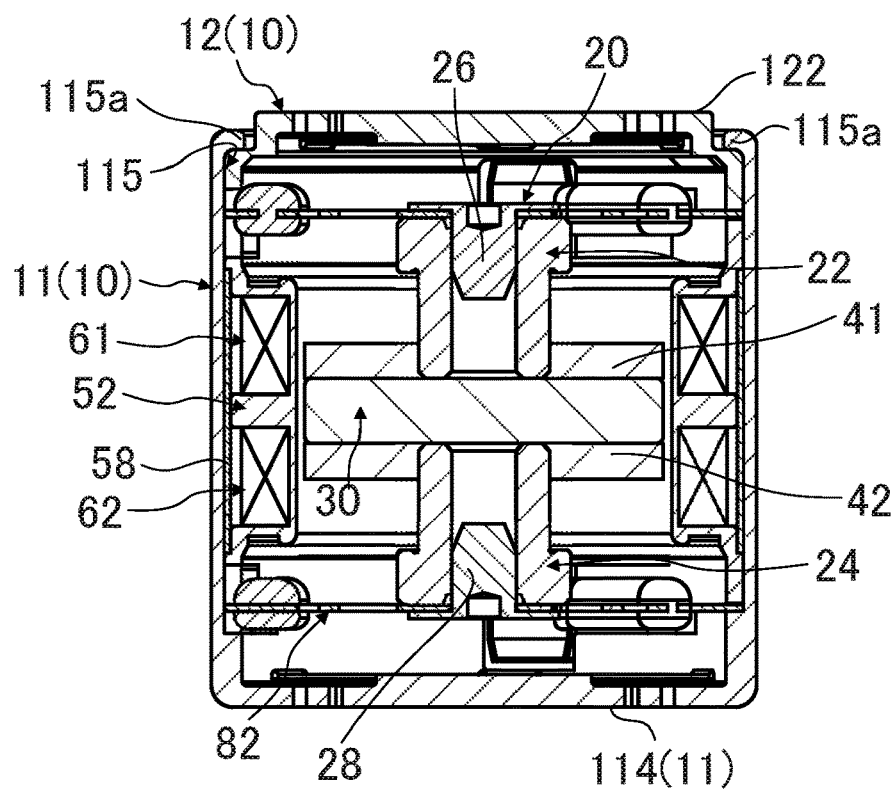

Further, lid portion 12 is welded and fixed to opening portion 115 of cup-shaped case main body 11. As illustrated in FIGS. 34A and 34B, lid portion 12 is fitted into opening portion 115 of case main body 11 so as to close opening portion 115 after coil bobbin part 52 to which movable body 20 is attached via elastic supporting parts 81 and 82 is housed in case main body 11. Then, opening end 115a of opening portion 115 extending above lid portion 12 in the periphery of lid portion 12 is caulked and bent, whereby lid portion 12 is fixed to case main body 11.

In addition, it is preferable that cable W be adhered and fixed to protruding portion 119 or 119A.

Figure 33:
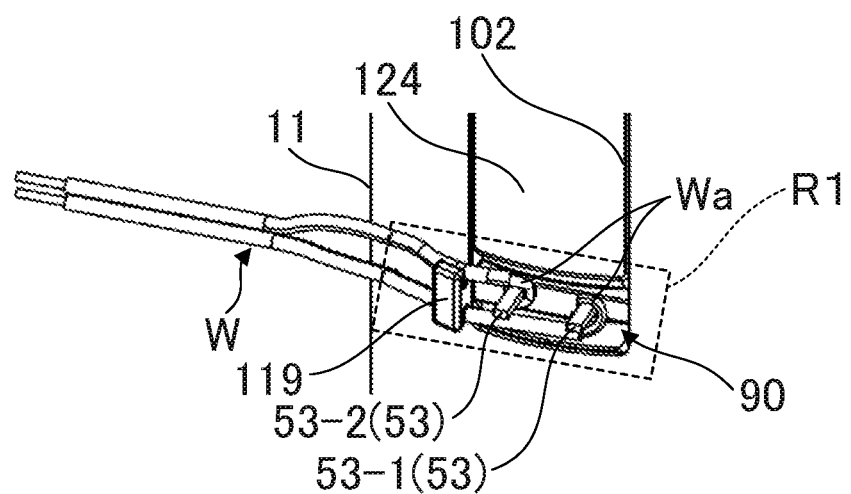
FIG. 33 illustrates a modification of the connection portion between the terminal tying parts and the cable in FIG. 22.

For example, cable W is fixed to protruding portion 119 by an adhesive in a state where end portions Wa are connected to terminal tying parts 53 as illustrated in FIG. 33. Region R1 illustrated in FIG. 33 indicates an adhesion region where an adhesive is applied.

Adhering cable W to protruding portion 119 prevents cable W from coming off terminal tying parts 53 even when an external force is exerted on cable W, so that it is possible to reduce the risk of problems such as disconnection.

Further, the fixation strength and the impact resistance can be greater than in the case of adhesive fixation. Further, the processes, i.e., the application process and the curing process, are not complicated and simple, so that the takt time can be reduced.

Further, in vibration actuator 1, movable body 20 is supported on fixing body 50 with a gap being interposed between the movable body and bobbin main-body portion 522 in the non-vibration state in which the movable body is not moving or in the vibration state, that is, when the movable body is moving. Thus, movable body 20 does not make contact with fixing body 50 when moving, i.e., when vibrating.

In addition, movable body 20 makes contact with inner circumferential surface 522a of bobbin main-body portion 522 only when an impact is applied to vibration actuator 1 itself, such as when vibration actuator 1 is dropped. That is, only when an impact is exerted, movable body 20 and bobbin main-body portion 522 move relative to each other in a range between outer circumferential surface 20a of movable body 20 and inner circumferential surface 522a of bobbin main-body portion 522, but movable body 20 does not make contact with coils 61 and 62.

Thus, according to vibration actuator 1, unlike the conventional vibration actuator, it does not happen that an impact exerted on the vibration actuator causes movable body 20 to be displaced and to make contact with the inner wall of the fixing body, so as to give an impact. That is, coils 61 and 62 of fixing body 50 are not damaged by an impact. Moreover, elastic supporting parts 81 and 82 themselves are not deformed by an impact, so that it is possible to eliminate the problems such as immobility of movable body 20 caused by deformation of elastic supporting parts 81 and 82.

As described above, vibration actuator 1 has the impact resistance, and is capable of outputting a preferable tactile vibration with high vibrational expressiveness.

Vibration actuator 1 is driven by an AC wave input from the power supplying section (e.g., drive control section 203 illustrated in FIGS. 35 and 36) to coils 61 and 62. That is, the energization direction of coils 61 and 62 are periodically switched, and the thrust in the F direction toward top surface portion 122 of lid portion 12 and the thrust in the −F direction toward bottom portion 114 act alternately on movable body 20. Thus, movable body 20 vibrates in the vibration direction (a winding axis direction of coils 61 and 62 orthogonal to the radial direction of coils 61 and 62, or the magnetization direction of magnet 30).

Hereinbelow, brief descriptions of the driving principle of vibration actuator 1 will be given. In vibration actuator 1 of the present embodiment, movable body 20 vibrates with respect to fixing body 50 at resonance frequency $F_r$ [Hz] computed by following Equation 1 in which m [kg] denotes the mass of movable body 20 and $K_{sp}$ denotes the spring constant of the springs (elastic supporting parts 81 and 82 that are springs).

(Equation 1)

$$F_r = \frac{1}{2\pi}\sqrt{\frac{K_{sp}}{m}} \qquad [1]$$

Since movable body 20 is considered as a mass in a vibration model of a spring-mass system, movable body 20 is brought into a resonance state when the AC wave of a frequency equal to resonance frequency $F_r$ of movable body 20 is input to coils 61 and 62. That is, movable body 20 can be efficiently vibrated by inputting the AC wave of a frequency being substantially equal to resonance frequency $F_r$ of movable body 20 to coils 61 and 62 from the power supplying section.

The equation of motion and the circuit equation representing the driving principle of vibration actuator 1 are shown below. Vibration actuator 1 is driven based on the equation of motion represented by following Equation 2 and based on the circuit equation represented by following Equation 3.

(Equation 2)

$$m\frac{d^2x(t)}{dt^2} = K_f i(t) - K_{sp}x(t) - D\frac{dx(t)}{dt} \qquad [2]$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

(Equation 3)

$$e(t) = Ri(t) + L\frac{di(t)}{dt} + K_e\frac{dx(t)}{dt} \qquad [3]$$

e(t): Voltage [V]
R: Resistance [Ω]
L: Inductance [H]
$K_e$: Counter electromotive force constant [V/(rad/s)]

That is, mass m [Kg], displacement x(t) [m], thrust constant $K_f$ [N/A], current i(t) [A], spring constant $K_{sp}$ [N/m], damping coefficient D [N/(m/s)], and the like of vibration actuator 1 may be changed appropriately as long as Equation 2 is satisfied. In addition, voltage e(t) [V], resistance R [Ω], inductance L [H], and counter electromotive force constant $K_e$ [V/(rad/s)] may be changed appropriately as long as Equation 3 is satisfied.

Accordingly, in vibration actuator 1, a great vibrational output can be obtained efficiently when the energization of coils 61 and 62 is performed using the AC wave corresponding to resonance frequency $F_r$ determined by mass m of movable body 20 and spring constant $K_{sp}$ of elastic supporting parts 81 and 82 that are leaf springs.

In addition, vibration actuator 1 satisfies Equations 2 and 3, and is driven by using a resonance phenomenon expressed using a resonance frequency indicated by Equation 1. Thus, in vibration actuator 1, the power consumed in a steady state is only loss caused by damping parts 72, so that vibration actuator 1 is capable of being driven with low power consumption, i.e., movable body 20 is capable of being linearly reciprocated with low power consumption. Further, vibrations in higher bands can be generated by increasing damping coefficient D.

According to the present embodiment, plate-like elastic supporting parts 81 and 82 are disposed above and below movable body 20, so that movable body 20 is stably driven in the upper-lower direction, and the magnetic flux of coils 61 and 62 can be efficiently distributed from upper and lower elastic supporting parts 81 and 82 above and below magnet 30. Thus, vibration actuator 1 is capable of achieving a high output vibration.

Further, fixing body 50 includes coil bobbin part 52 that serves a holding function of holding coils 61 and 62 and a protecting function of protecting coils 61 and 62 from movable body 20. Thus, even when fixing body 50 is impacted, fixing body 50 withstands the impact, and prevents damage such as deformation of elastic supporting parts 81 and 82. Further, an impact is to be transmitted to coils 61 and 62 via bobbin main-body portion 522 formed from resin, so that damage can be reduced, and thus, highly reliable vibration actuator 1 is achieved.

Thus, according to vibration actuator 1, it is possible to achieve miniaturization at low cost, and vibration actuator 1 has impact resistance and is capable of generating a preferable tactile vibration at high output.

(Electronic Device)

Figure 35:
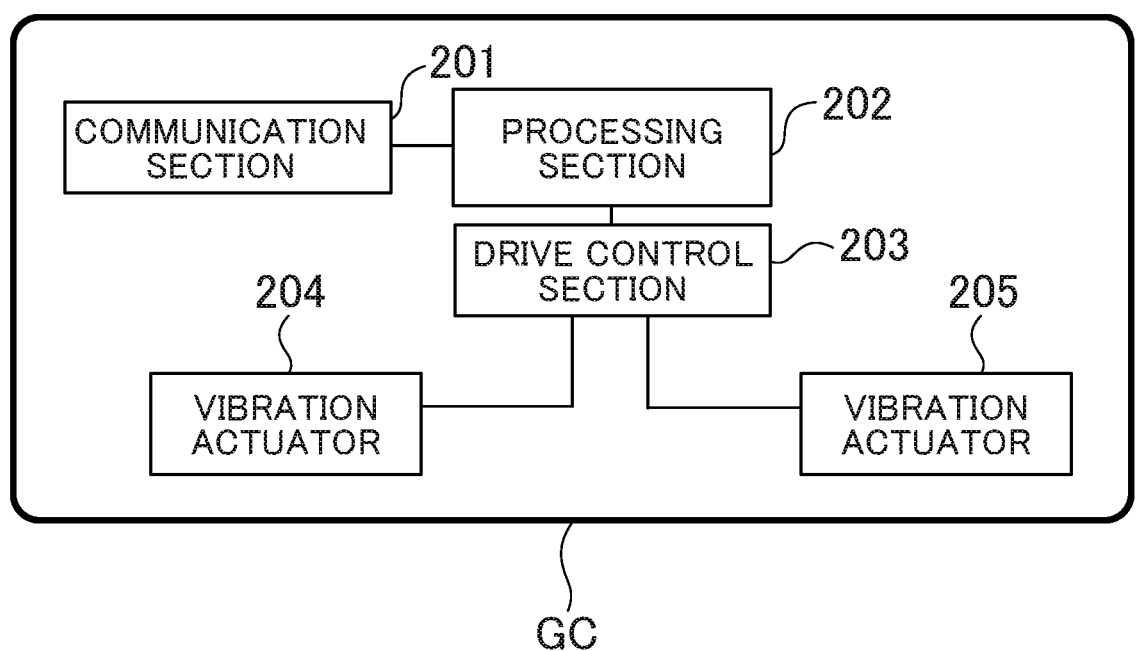
FIG. 35 illustrates an example of an electronic device on which the vibration actuator is mounted.
Figure 36:
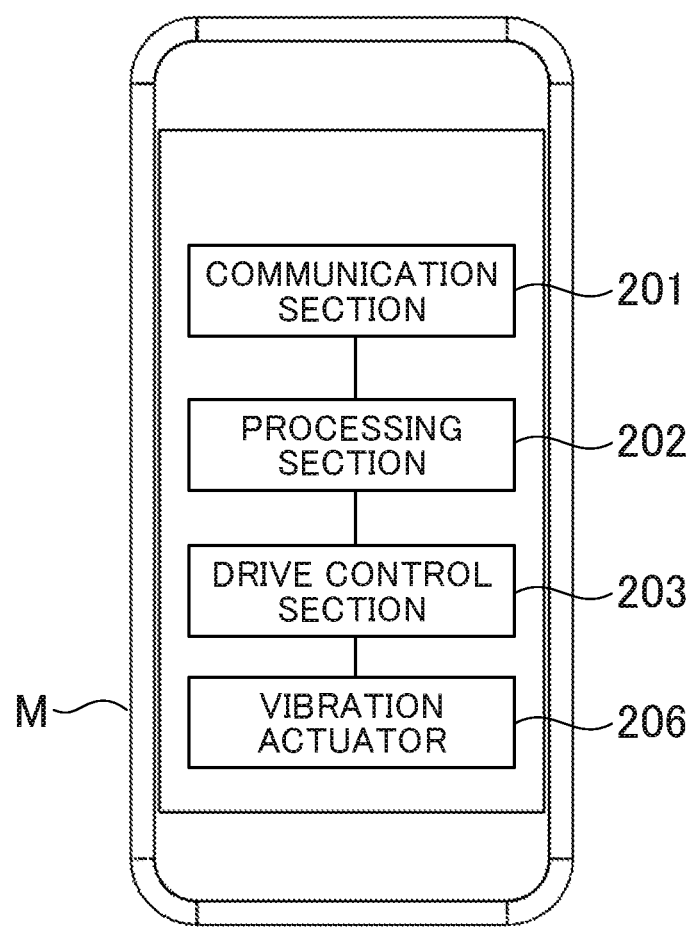
FIG. 36 illustrates an example of an electronic device on which the vibration actuator is mounted.

FIGS. 35 and 36 illustrate exemplary mounting configurations of vibration actuator 1. FIG. 35 illustrates an example in which vibration actuator 1 is mounted on game controller GC, and FIG. 36 illustrates another example in which vibration actuator 1 is mounted on mobile terminal M.

Game controller GC is connected to a game-machine main body by wireless communication, for example, and is used by a user gripping or holding it. Here, game controller GC has a rectangular plate shape, and the user grasps the left and right sides of game controller GC with both hands for operation.

Game controller GC notifies the user of a command from the game-machine main body by vibrations. Note that, game controller GC includes a function other than command notification (for example, an input operation section for input operation to the game-machine main body), which is not illustrated in the figures though.

Mobile terminal M is a portable communication terminal, such as a mobile phone or smartphone, for example. Mobile terminal M vibrates to notify a user of an incoming call from an external communication apparatus and also to implement functions of mobile terminal M (for example, functions of giving an operational feel and/or realism).

As illustrated in FIGS. 35 and 36, game controller GC and mobile terminal M each have communication section 201, processing section 202, drive control section 203, and vibration actuators 204, 205, and/or 206 each of which is vibration actuator 1 as a drive section. Note that, a plurality of vibration actuators 204 and 205 are mounted in game controller GC.

In game controller GC and mobile terminal M, it is preferable that vibration actuators 204, 205, and/or 206 be mounted such that, for example, the main surface of the terminal is parallel to the surfaces of vibration actuators 204, 205, and/or 206 (here, the bottom surface of bottom portion 114) which are orthogonal to the vibration direction. The main surface of the terminal is a surface that makes contact with the body surface of the user, and means a vibration transmission surface that makes contact with the body surface of the user to transmit vibrations in the present embodiment. Note that, the main surface of the terminal and the bottom surfaces of bottom portions 114 of vibration actuators 204, 205, and/or 206 may also be disposed to be orthogonal to one another.

Specifically, vibration actuators 204 and 205 are mounted in game controller GC such that the vibration direction is orthogonal to the surface with which the fingertip, the pad of the finger, the palm of the hand, and/or the like of the user operating the game controller make contact, or the surface on which the operation section is disposed. Further, in the case of mobile terminal M, vibration actuator 206 is mounted such that a display screen (touch panel surface) is orthogonal to the vibration direction. Thus, vibrations in a direction orthogonal to the main surface of game controller GC or mobile terminal M are transmitted to the user.

Communication section 201 is connected to an external communication apparatus by wireless communication, and receives a signal from the communication apparatus to output it to processing section 202. In the case of game controller GC, the external communication apparatus is a game-machine main body as an information communication terminal, and performs communication in accordance with short-range radio communication standards such as Bluetooth (registered trademark) and the like. In the case of mobile terminal M, the external communication apparatus is, for example, a base station, and performs communication in accordance with mobile communication standards.

Processing section 202 converts by using a conversion circuit section (not illustrated) an input signal into a driving signal for driving vibration actuators 204, 205, and/or 206, and outputs the driving signal to drive control section 203. Note that, in mobile terminal M, processing section 202 generates a driving signal based on a signal input from communication section 201 and on signals input from various functional sections (not illustrated; for example, an operation section such as a touch panel or the like).

Drive control section 203 is connected to vibration actuators 204, 205, and/or 206, and a circuit for driving vibration actuators 204, 205, and/or 206 is implemented in drive control section 203. Drive control section 203 supplies a drive signal to vibration actuators 204, 205, and/or 206.

Vibration actuators 204, 205, and/or 206 are driven in accordance with the drive signal from drive control section 203. Specifically, in vibration actuators 204, 205, and/or 206, movable body 20 vibrates in the direction orthogonal to the main surface of game controller GC or mobile terminal M.

Movable body 20 may make contact with top surface portion 122 of lid portion 12 or with bottom portion 114 via the dampers each time movable body 20 vibrates. In this case, an impact on top surface portion 122 of lid portion 12 or bottom portion 114 due to the vibration of movable body 20, i.e., the impact on the housing is directly transmitted as vibrations to the user. In particular, a plurality of vibration actuators 204 and 205 are mounted in game controller GC, so that it is possible to drive one of the plurality of vibration actuators 204 and 205 or both of the of vibration actuators 204 and 205 at the same time depending on the input drive signal.

Since the vibration in the direction orthogonal to the body surface of the user is transmitted to the body surface of the user in contact with game controller GC or mobile terminal M, a sufficient tactile vibration can be given to the user. Game controller GC is capable of giving a tactile vibration to the user with one or both of vibration actuators 204 and 205, so that application of vibrations with high vibrational expressiveness, such as selective application of at least strong or weak vibrations is possible.

While the invention made by the present inventor has been specifically described based on the preferred embodiment, it is not intended to limit the present invention to the above-mentioned preferred embodiment, but the present invention may be further modified within the scope and spirit of the invention defined by the appended claims.

The vibration actuator according to the present invention is also suitable for application to portable devices other than game controller GC and mobile terminal M (for example, a portable information terminal such as a tablet PC, a portable game terminal, or a wearable terminal worn and used by a user). In addition to the above-described portable devices, vibration actuator 1 of the present embodiment can also be used in an electric barber and beauty instrument such as a beauty massager requiring vibration.

INDUSTRIAL APPLICABILITY

The vibration actuator according to the present invention can achieve miniaturization at low cost, has impact resistance, can give a preferable tactile vibration at high output to a user, and is useful for being mounted on an electronic device such as a game machine terminal or a portable terminal.

REFERENCE SIGNS LIST

1 Vibration actuator
9 Routing part
10 Case
11 Case main body
12 Lid portion
13, 13A Drive unit
20 Movable body
20a Outer circumferential surface
30 Magnet
30a Front surface
30b Back surface
41, 42 Movable-body core
50 Fixing body
52, 52A Coil bobbin part (coil holding part)
52b, 52c Coil attachment portion
53, 53-1, 53-2 Terminal tying part (coil connection part)
54 Movable-range forming part (protrusion)
55 Linking groove portion (groove portion)
58, 58A Electromagnetic shield part
61 Coil (first coil)
62 Coil (second coil)
72 Damping part
73 Attachment part
81, 82 Elastic supporting part
90 Terminal bringing-out portion
92, 92-1, 92-2 Coil guide portion
93 Inclined portion
112 Circumferential wall portion
114 Bottom portion
115 Opening portion
116, 126 Vent hole
118 Step portion
119, 119A Protruding portion
122 Top surface portion
124 Hanging portion
128 Pressing portion
201 Communication section
202 Processing section
203 Drive control section
204, 205, 206 Vibration actuator
222, 242 Joint portion
224, 244 Spring fixation portion
522 Bobbin main-body portion (coil protection wall portion)
522a Inner circumferential surface
526 Central flange portion (central wall portion)
526a Outer circumferential portion
527, 528 Flange portion
527a Upper end surface
528a Lower end surface
529 Positioning engagement portion (recess)
589 Engaged portion
802 Inner circumferential portion
804 Deformation arm
806 Outer circumferential fixing portion
807 Outer circumferential portion
808 Positioning groove
1192, 1196 Protruding piece
1194, 1198 Orthogonal piece

What is claimed is:

1. A vibration actuator comprising:
a movable body comprising: a disk-shaped magnet having front and rear surfaces and not provided with a through hole between the front and rear surfaces; a pair of magnetic parts respectively fixed to the front and rear surfaces of the disk-shaped magnet; and a pair of spring retaining parts respectively connected to the pair of magnetic parts;
a pair of elastic support parts respectively connected to the pair of spring retaining parts and configured to support the movable body;
a fixing body comprising a cylindrical protection wall portion forming a hollow inner space, a pair of annular coils and a cylindrical magnetic shield and configured to connect to the pair of elastic support parts in a state where the cylindrical protection wall portion, the pair of annular coils and the cylindrical magnetic shield are disposed in this sequential arrangement order from an outer circumferential side of the movable body, and accommodate the movable body in the hollow inner space such that the movable body is capable of reciprocally vibrating in an axial direction; and
a resin case which comprises a circumferential wall portion and a lid portion configured to close the circumferential wall portion and accommodates therein the fixing body, the circumferential wall portion having a cutout portion configured to engage with the lid portion and an opening portion for wires, the opening portion for wires being in communication with the cutout portion, and the wires being configured to supply power to the pair of annular coils, wherein
the cylindrical protection wall portion comprises: a cylindrical portion disposed between the movable body and the pair of annular coils; and a pair of flanges which extend outward in a radial direction from upper and lower end portions of the cylindrical portion and interpose therebetween the cylindrical magnetic shield such that a center in length of the cylindrical magnetic shield in the axial direction coincides with a center of the movable body in the axial direction.

2. The vibration actuator according to claim 1, wherein the lid portion of the resin case comprises a vent hole.

3. The vibration actuator according to claim 1, wherein the resin case comprises a wire fixation portion configured to fix wires in the circumferential wall portion.

4. An electronic apparatus comprising the vibration actuator according to claim 1.

* * * * *